United States Patent
Tsuda et al.

(10) Patent No.: US 9,688,267 B2
(45) Date of Patent: Jun. 27, 2017

(54) CONTROL DEVICE FOR VEHICLE DRIVING DEVICE

(71) Applicant: AISIN AW CO., LTD., Anjo-shi, Aichi-ken (JP)

(72) Inventors: Kohei Tsuda, Nishio (JP); Keiichirou Kusabe, Okazaki (JP); Tomohiro Onouchi, Anjo (JP); Shoichi Ishida, Toyoake (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 15/122,815

(22) PCT Filed: Mar. 20, 2015

(86) PCT No.: PCT/JP2015/058500
§ 371 (c)(1),
(2) Date: Aug. 31, 2016

(87) PCT Pub. No.: WO2015/146835
PCT Pub. Date: Oct. 1, 2015

(65) Prior Publication Data
US 2017/0072934 A1    Mar. 16, 2017

(30) Foreign Application Priority Data

Mar. 28, 2014 (JP) .................. 2014-069750
Mar. 28, 2014 (JP) .................. 2014-069751

(51) Int. Cl.
*B60W 10/00* (2006.01)
*B60W 20/10* (2016.01)
(Continued)

(52) U.S. Cl.
CPC ............. *B60W 20/10* (2013.01); *B60K 6/365* (2013.01); *B60K 6/383* (2013.01); *B60K 6/387* (2013.01);
(Continued)

(58) Field of Classification Search
CPC ............... B60W 20/10; B60W 10/115; B60W 2710/02; B60W 2710/83;
(Continued)

(56) References Cited

U.S. PATENT DOCUMENTS 6,128,565 A    10/2000   Tsutsui et al.
7,282,010 B2 *  10/2007   Iriyama ................. B60W 30/19
                                                477/107

(Continued)

FOREIGN PATENT DOCUMENTS

JP    H07-17302 A    1/1995
JP    H09-125998 A   5/1997
(Continued)

OTHER PUBLICATIONS

Jun. 16, 2015 Search Report issued in International Patent Application No. PCT/JP2015/058500.

*Primary Examiner* — David J Hlavka
(74) *Attorney, Agent, or Firm* — Oliff PLC

(57) ABSTRACT

A control device for controlling a vehicle driving device provided with a transmission apparatus including a plurality of engagement devices in a power transmission path between a driving force source and a wheel and selectively forming a plurality of transmission shift stages having different transmission shift ratios depending on engagement states of the plurality of engagement devices.

20 Claims, 10 Drawing Sheets

(51) Int. Cl.
| | |
|---|---|
| B60W 10/04 | (2006.01) |
| B60W 10/06 | (2006.01) |
| B60W 10/10 | (2012.01) |
| B60W 10/11 | (2012.01) |
| B60W 20/00 | (2016.01) |
| F16H 61/06 | (2006.01) |
| F16H 61/686 | (2006.01) |
| F02D 29/02 | (2006.01) |
| B60K 6/365 | (2007.10) |
| B60K 6/383 | (2007.10) |
| B60K 6/387 | (2007.10) |
| B60K 6/442 | (2007.10) |
| B60K 6/547 | (2007.10) |
| B60W 10/02 | (2006.01) |
| B60W 10/115 | (2012.01) |
| F16D 48/06 | (2006.01) |
| F16D 21/00 | (2006.01) |
| F16D 41/00 | (2006.01) |

(52) U.S. Cl.
CPC .............. *B60K 6/442* (2013.01); *B60K 6/547* (2013.01); *B60W 10/02* (2013.01); *B60W 10/04* (2013.01); *B60W 10/06* (2013.01); *B60W 10/10* (2013.01); *B60W 10/11* (2013.01); *B60W 10/115* (2013.01); *B60W 20/00* (2013.01); *F02D 29/02* (2013.01); *F16D 48/06* (2013.01); *F16H 61/061* (2013.01); *F16H 61/686* (2013.01); *B60W 2510/1005* (2013.01); *B60W 2710/02* (2013.01); *B60W 2710/0666* (2013.01); *B60W 2710/083* (2013.01); *B60W 2710/1005* (2013.01); *B60Y 2200/92* (2013.01); *B60Y 2300/182* (2013.01); *B60Y 2300/188* (2013.01); *B60Y 2300/42* (2013.01); *B60Y 2300/43* (2013.01); *B60Y 2300/60* (2013.01); *B60Y 2300/70* (2013.01); *F16D 21/00* (2013.01); *F16D 41/00* (2013.01); *F16D 2500/106* (2013.01); *F16D 2500/1045* (2013.01); *F16D 2500/1087* (2013.01); *F16D 2500/10412* (2013.01); *F16D 2500/10493* (2013.01); *Y10S 903/911* (2013.01); *Y10S 903/913* (2013.01); *Y10S 903/914* (2013.01); *Y10S 903/919* (2013.01); *Y10S 903/93* (2013.01)

(58) Field of Classification Search
CPC ... B60W 2510/083; B60W 2510/1005; B60W 2710/0666; B60W 2710/1005; B60W 10/02; B60W 10/06; B60W 10/10; B60W 10/11; B60W 20/00; B60W 10/04; B60K 6/442; B60K 6/383; B60K 6/365; B60K 6/547; F16D 48/06; F16D 41/00; F16D 21/00; F16D 2500/10412; F16D 2500/1045; F16D 2500/10493; F16D 2500/106; F16D 2500/1087; F02D 29/02; F16H 61/061; F16H 61/686
See application file for complete search history.

(56) References Cited

U.S. PATENT DOCUMENTS

| | | | |
|---|---|---|---|
| 7,731,629 B2 | 6/2010 | Asami et al. | |
| 8,636,613 B2* | 1/2014 | Teslak | B60W 10/02 475/125 |
| 8,827,060 B2* | 9/2014 | Pietron | F16H 61/061 192/54.3 |
| 9,008,926 B2* | 4/2015 | Heap | B60K 6/26 192/3.51 |
| 2006/0100060 A1* | 5/2006 | Kraska | B60K 6/405 477/156 |
| 2006/0135316 A1 | 6/2006 | Fujii et al. | |
| 2007/0056783 A1* | 3/2007 | Joe | B60K 6/48 180/65.265 |
| 2012/0316738 A1* | 12/2012 | Teslak | F16H 59/16 701/53 |

FOREIGN PATENT DOCUMENTS

| | | |
|---|---|---|
| JP | H11-82712 A | 3/1999 |
| JP | 2003-139234 A | 5/2003 |
| JP | 2008-045567 A | 2/2008 |
| JP | 2008-051268 A | 3/2008 |
| JP | 2009-058071 A | 3/2009 |
| JP | 2009-097445 A | 5/2009 |

* cited by examiner

FIG. 4

|     | C1 | C2 | C3 | B1 | B2  | OWC |
|-----|----|----|----|----|-----|-----|
| 1st | ○  |    |    |    | (○) | △   |
| 2nd | ○  |    |    | ○  |     |     |
| 3rd | ○  |    | ○  |    |     |     |
| 4th | ○  | ○  |    |    |     |     |
| 5th |    | ○  | ○  |    |     |     |
| 6th |    | ○  |    | ○  |     |     |
| Rev |    |    | ○  |    | ○   |     |

CONTROL DEVICE FOR VEHICLE DRIVING DEVICE

BACKGROUND

The present disclosure relates to a control device for controlling a vehicle driving device provided with a transmission apparatus including a plurality of engagement devices in a power transmission path between a driving force source and wheels and selectively forming a plurality of transmission shift stages having different transmission shift ratios depending on the engagement states of the plurality of engagement devices.

As for the control device described above, for example, a technique disclosed in the following JP-A-2008-45567 has already been known. In the technique described in JP-A-2008-45567, during upshift control for switching the transmission shift stage of a transmission apparatus to a transmission shift stage having a smaller transmission shift ratio, the engagement pressure of an engagement side engagement device is increased by torque phase control and the torque of a driving force source is reduced while keeping the increased engagement pressure, so as to start a rotation change for increasing the rotation speed difference of the release side engagement device and reducing the rotation speed difference of the engagement side engagement device.

SUMMARY

However, even after reducing the engagement pressure of the release side engagement device, which is an engagement device to be released for switching the transmission shift stage, a residual pressure may remain due to a response delay. When the torque of the driving force source is reduced in this state, a negative torque may be transferred to wheels via the release side engagement device in which a transmission torque capacity remains. Whether the driver feels unnatural due to a drop in the torque by the release side engagement device depends on the torque of the driving force source.

Accordingly, there is a need for a control device that appropriately prevents reduction in the torque transferred to the wheels via the release side engagement device according to the torque of the driving force source even when the residual pressure remains in the release side engagement device in upshift control.

A control device for controlling a transmission apparatus including a plurality of engagement devices in a power transmission path between a driving force source and a wheel and selectively forming a plurality of transmission shift stages having different transmission shift ratios depending on engagement states of the plurality of engagement devices, according to an exemplary aspect of the present disclosure, the control device includes an electronic control unit that includes control logic, which when executed: starts upshift control for switching to a transmission shift stage having a lower transmission shift ratio, the transmission shift stage being one of the plurality of transmission shift stages, the transmission shift ratio being one of the plurality of transmission shift ratios, performs torque phase control for increasing an engagement pressure of an engagement side engagement device to be engaged for the switching to the transmission shift stage, the engagement side engagement device being one of the plurality of engagement devices, and reducing an engagement pressure of an release side engagement device to be released for the switching to the transmission shift stage, the release side engagement device being one of the plurality of engagement devices, and performs inertia phase control for increasing a rotation speed difference of the release side engagement device and reducing a rotation speed difference of the engagement side engagement device to perform a rotation change after starting the torque phase control, in which the electronic control unit performs torque down control for reducing a torque of the driving force source in the inertia phase control and changes a start timing of the torque down control relative to an execution timing of the torque phase control according to at least a pre-transmission shift torque, which is the torque of the driving force source before starting the upshift control.

Even when control is performed so that the engagement pressure of the release side engagement device is reduced in torque phase control, the actual engagement pressure may be reduced late due to a response delay. When torque down control for reducing the torque of the driving force source is made in the state in which the residual pressure is present in the release side engagement device due to a reduction delay, the negative torque corresponding to the transmission torque capacity of the release side engagement device may be transferred to the wheels via the release side engagement device in which the transmission torque capacity remains, possibly reducing the torque transferred to the wheels. In addition, since a transmission torque to the wheels changes depending on the pre-transmission shift torque of the driving force source before the start of upshift control, whether the driver feels unnatural due to a drop in the torque by the residual pressure in the release side engagement device depends on the pre-transmission shift torque.

In the above characteristic configuration, the start timing of torque down control relative to the execution timing of torque phase control can be appropriately changed depending on the pre-transmission shift torque to reduce an unnatural feeling of the driver.

The electronic control unit preferably delays the start timing of the torque down control relative to the execution timing of the torque phase control continuously or in a stepwise manner as the pre-transmission shift torque is reduced.

In particular, when the pre-transmission shift torque is small and the torque transferred to the wheels is small, a drop in the torque by the release side engagement device relative to the transmission torque to the wheels may become large and the driver may feel more unnatural. In the above structure, since the start timing of torque down control relative to the execution timing of torque phase control is delayed as the pre-transmission shift torque is reduced, the residual pressure of the release side engagement device at the start of torque down control can be reduced and the transmission torque capacity can be reduced. Accordingly, the magnitude of a negative torque transferred to the wheels via the release side engagement device can be reduced by torque down control as the pre-transmission shift torque is reduced. Accordingly, when the torque transferred to the wheels is low, a drop in the torque relative to the transmission torque to the wheels can be reduced and the driver feels less unnatural.

In contrast, when the pre-transmission shift torque is large and the torque transferred to the wheels is large, a drop in the torque by the release side engagement device relative to the transmission torque to the wheels becomes small and the driver feels less unnatural. Accordingly, the start timing of torque down control relative to the execution timing of torque phase control is advanced as the pre-transmission shift torque is increased, so that a rotation change can be started early and upshift control can be completed.

In addition, the electronic control unit preferably reduces the reduction speed of the torque of the driving force source in the torque down control continuously or in a stepwise manner as the pre-transmission shift torque is reduced.

In this structure, since the reduction speed of the torque of the driving force source is reduced as the pre-transmission shift torque is reduced, the torque reduction amount of torque down control can be reduced. Accordingly, when the pre-transmission shift torque is small and the torque transferred to the wheels is small, reduction in the transmission torque transferred to the wheels via the release side engagement device having a residual pressure can be suppressed. Accordingly, a drop in the torque transferred to the wheels can be small and the driver feels less unnatural.

In contrast, when the pre-transmission shift torque is large and the torque transferred to the wheels is large, a drop in the torque by the release side engagement device relative to the transmission torque to the wheels becomes small and the driver feels less unnatural. Accordingly, the reduction speed of the torque of the driving force source is increased as the pre-transmission shift torque is increased, so that a rotation change can be started early and upshift control can be completed.

In addition, after starting the inertia phase control, the electronic control unit preferably performs engagement pressure increase control for temporarily increasing the engagement pressure of the engagement side engagement device and changes a temporary increase amount of the engagement pressure in the engagement pressure increase control according to the pre-transmission shift torque.

When the engagement pressure of the engagement side engagement device is temporarily increased by engagement pressure increase control, the torque transferred to the wheels via the engagement side engagement device can be increased temporarily and the negative torque transferred to the wheels via the release side engagement device in which the transmission torque capacity remains can be canceled. Accordingly, the driver feels less unnatural.

In addition, since the transmission torque to the wheels depends on the pre-transmission shift torque of the driving force source before the start of upshift control, whether the driver feels unnatural due to the negative torque transferred to the wheels via the release side engagement device is apt to depend on the pre-transmission shift torque. In the above structure, the temporary increase amount of the engagement pressure can be appropriately changed depending on the pre-transmission shift torque to reduce an unnatural feeling of the driver.

In addition, the electronic control unit preferably increases the temporary increase amount of the engagement pressure in the engagement pressure increase control continuously or in a stepwise manner as the pre-transmission shift torque is reduced.

When the start timing of torque down control relative to the execution timing of torque phase control is delayed as pre-transmission shift torque is reduced, the timing at which the release side engagement device having the residual pressure is shift from a direct engagement state to a slip engagement state may be delayed and the end timing of inertia phase control may be delayed.

In the above structure, an increase in the transmission torque of the engagement side engagement device in the engagement pressure increase control can reduce the transmission torque of the release side engagement device. Then, when the transmission torque of the release side engagement device is reduced to a lower limit obtained by multiplying the transmission torque capacity of the release side engagement device by the minus sign, the release side engagement device shifts to the slip engagement state and can start a rotation change. Accordingly, it is possible to suppress the delay of the timing at which the release side engagement device shifts to the slip engagement state by increasing the temporary increase amount of the engagement pressure through engagement pressure increase control.

In addition, since the increase in the engagement pressure of the engagement side engagement device is temporary, the increased engagement pressure of the engagement side engagement device can be reduced according to the residual pressure of the release side engagement device that reduces over time.

In addition, if the engagement pressure of the engagement side engagement device is temporarily increased through engagement pressure increase control, the torque transferred to the wheels via the engagement side engagement device can be increased temporarily. An increase in the transmission torque to the wheels in engagement pressure increase control can cancel a negative torque transferred to the wheels via the release side engagement device and the driver feels less unnatural.

In addition, as one or both of the transmission shift ratio of the transmission shift stage before the upshift control and the transmission shift ratio of the transmission shift stage after the upshift control are reduced, the electronic control unit preferably delays the start timing of the torque down control relative to the execution timing of the torque phase control continuously or in a stepwise manner and increases the temporal increase amount of the engagement pressure in the engagement pressure increase control continuously or in a stepwise manner.

Since the torque transferred to the wheels is reduced as one or both of the transmission shift ratio of the transmission shift stage after upshift control and the transmission shift ratio of the transmission shift stage after upshift control are reduced even when the value of the pre-transmission shift torque is the same, the driver may feel more unnatural due to a drop in the torque by release side engagement device. In the above structure, the start timing of the torque down control is delayed and the temporary increase amount of the engagement pressure is increased continuously or in a stepwise manner as one or both of the transmission shift ratio of the transmission shift stage after the upshift control and the transmission shift ratio of the transmission shift stage after the upshift control are reduced, so that a drop in the torque relative to the transmission torque to the wheels can be reduced when the torque transferred to the wheels is reduced, the driver feel less unnatural, and it is possible to suppress a delay in the timing at which the release side engagement device shifts to the slip engagement state.

In contrast, since the torque transferred to the wheels is increased as one or both of the transmission shift ratio of the transmission shift stage after upshift control and the transmission shift ratio of the transmission shift stage after upshift control are increased even when the value of the pre-transmission shift torque is the same, the driver feels less unnatural due to a drop in the torque by release side engagement device. Accordingly, the start timing of torque down control can be advanced as one or both of the transmission shift ratio of the transmission shift stage after upshift control and the transmission shift ratio of the transmission shift stage after upshift control are increased, so that a rotation change can be started early and upshift control can be completed even when the temporary increase amount of the engagement pressure is smaller.

In addition, the electronic control unit preferably delays the start timing of the torque down control relative to the execution timing of the torque phase control continuously or in a stepwise manner as the transmission shift ratio of the transmission shift stage after the upshift control is reduced.

Since the torque transferred to the wheels is reduced as the transmission shift ratio of the transmission shift stage after upshift control is reduced even when the value of the pre-transmission shift torque is the same, the driver may feel more unnatural due to a drop in the torque by release side engagement device. In the above structure, by delaying the start timing of the torque down control as the transmission shift ratio of the transmission shift stage after the upshift control is reduced, a drop in the torque relative to the transmission torque to the wheels can be reduced when the torque transferred to the wheels is low and the driver feels less unnatural.

In contrast, since the torque transferred to the wheels is increased as the transmission shift ratio of the transmission shift stage after upshift control is increased even when the value of the pre-transmission shift torque is the same, the driver feels less unnatural due to a drop in the torque by release side engagement device. Accordingly, by advancing the start timing of the torque down control to start a rotation change earlier as the transmission shift ratio of the transmission shift stage after the upshift control is increased, the upshift control can be completed.

In addition, after starting the torque down control, the electronic control unit preferably performs, as the torque down control, gradual torque down control for gradually reducing the torque of the driving force source, ends the gradual torque down control after a rotation speed difference of the release side engagement device is generated, performs rapid torque down control for reducing the torque of the driving force source at a speed higher than in the gradual torque down control, and delays the start timing of the gradual torque down control relative to the execution timing of the torque phase control continuously or in a stepwise manner as the pre-transmission shift torque is reduced.

Since the torque of the driving force source is gradually reduced through the gradual torque down control, the release side engagement device can shift to the slip engagement state while suppressing the reduction in the torque transferred to the wheels via the release side engagement device having the residual pressure and causing the driver to feel less unnatural.

In contrast, since the release side engagement device has already shifted to the slip engagement state after generation of a rotation speed difference of the release side engagement device and the torque corresponding to the transmission torque capacity has been transferred, the torque transferred to the wheels via the release side engagement device is not reduced even when the torque of driving force source is rapidly reduced by rapid torque down control, and the inertia phase control can be ended early by rapidly progressing a rotation change by rapid torque down control.

BRIEF DESCRIPTION OF THE DRAWINGS

FIG. 4 is an operation table for a transmission apparatus according to the embodiment of the disclosure.

DETAILED DESCRIPTION OF EMBODIMENTS

Figure 1:
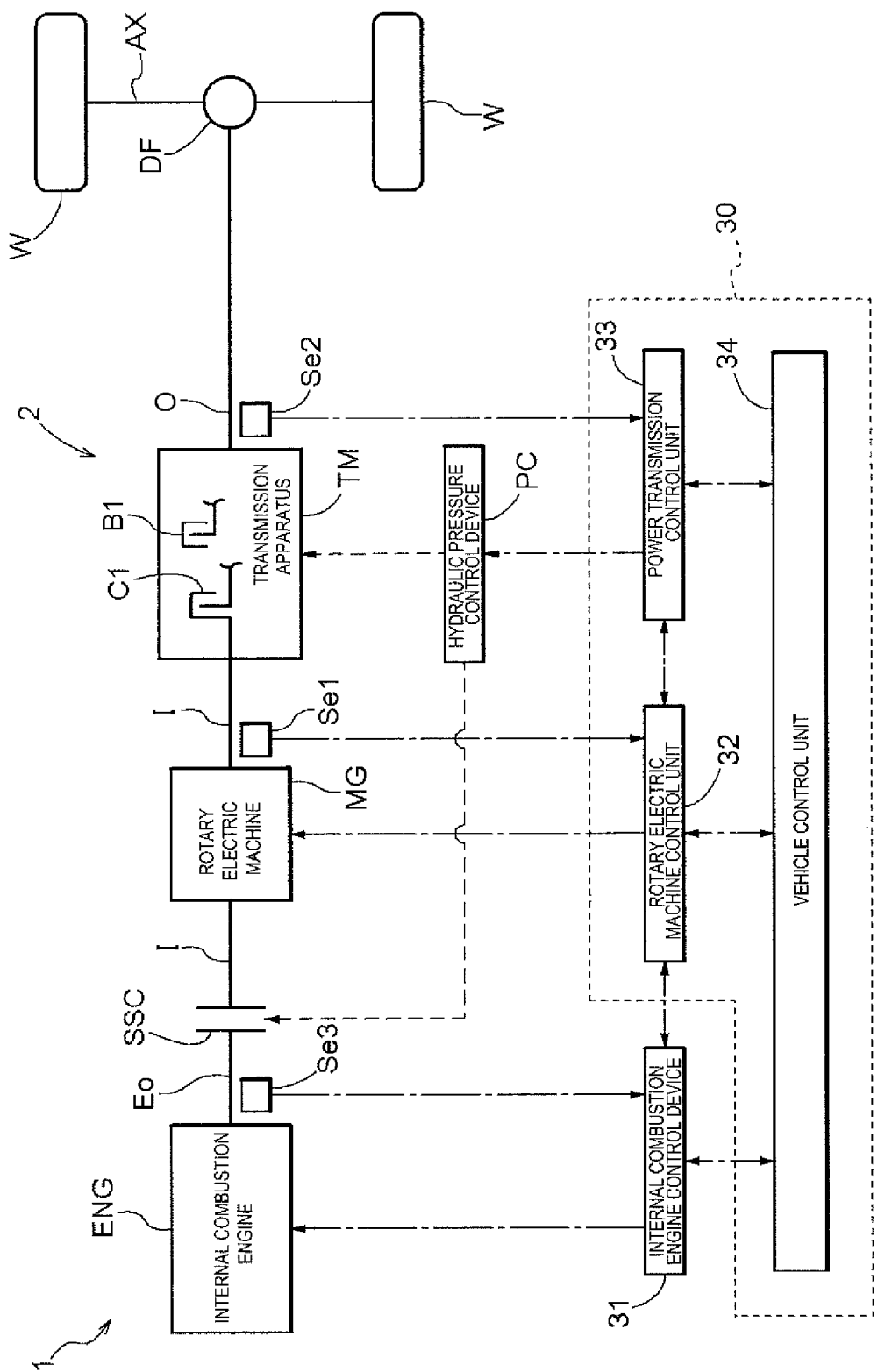
FIG. 1 is a schematic view illustrating the schematic structures of a vehicle driving device and a control device according to the embodiment of the disclosure.

A control device 30 (referred to below simply as "control device 30") for a vehicle driving device 1 according to an embodiment will be described with reference to the drawings. FIG. 1 is a schematic view illustrating the schematic structures of the vehicle driving device 1 and the control device 30 according to the embodiment. In the figure, solid lines indicate the transmission paths of driving forces, dashed lines indicate the supply paths of working oil, and dot-dash lines indicate the transmission paths of signals.

The vehicle driving device 1 is provided with a transmission apparatus TM in a power transmission path 2 between a driving force source and wheels W. The transmission apparatus TM includes a plurality of engagement devices C1, B1, ... and selectively forms a plurality of transmission shift stages having different transmission shift ratios according to the engagement states of the plurality engagement devices C1, B1, ....

In the embodiment, an internal combustion engine ENG and a rotary electric machine MG are provided as driving force sources. The rotary electric machine MG is drivably coupled to an input shaft I of the transmission apparatus TM and the internal combustion engine ENG is drivably coupled to the input shaft I via an engine engagement device SSC. As described above, in the power transmission path 2 between the internal combustion engine ENG and the wheels W, the engine engagement device SSC, a rotary electric machine MG, and the transmission apparatus TM are disposed in order from the side of the internal combustion engine ENG.

In the application, "drivably coupling" indicates the state in which two rotary elements are coupled to each other so as to transfer a driving force, the state in which the two elements are coupled to each other so as to be integrally rotatable, or the state in which the two elements are coupled to each other via one or more transmission members so as to transfer a driving force. Such transmission members include various types of members that transfer rotation by changing or holding the speed, such as, for example, a shaft, gear mechanism, belt, and chain. In addition, such transmission members may include an engagement device selectively transferring rotation and a driving force, such as, for example, a friction engagement device and meshing engagement device.

A hybrid vehicle includes the control device 30 for controlling the vehicle driving device 1. The control device 30 according to the embodiment includes a rotary electric machine control unit 32 for controlling the rotary electric machine MG, a power transmission control unit 33 for controlling the transmission apparatus TM and the engine engagement device SSC, and a vehicle control unit 34 that integrates these control units for controlling the vehicle driving device 1. In addition, the hybrid vehicle includes an internal combustion engine control device 31 for controlling the internal combustion engine ENG.

Figure 2:
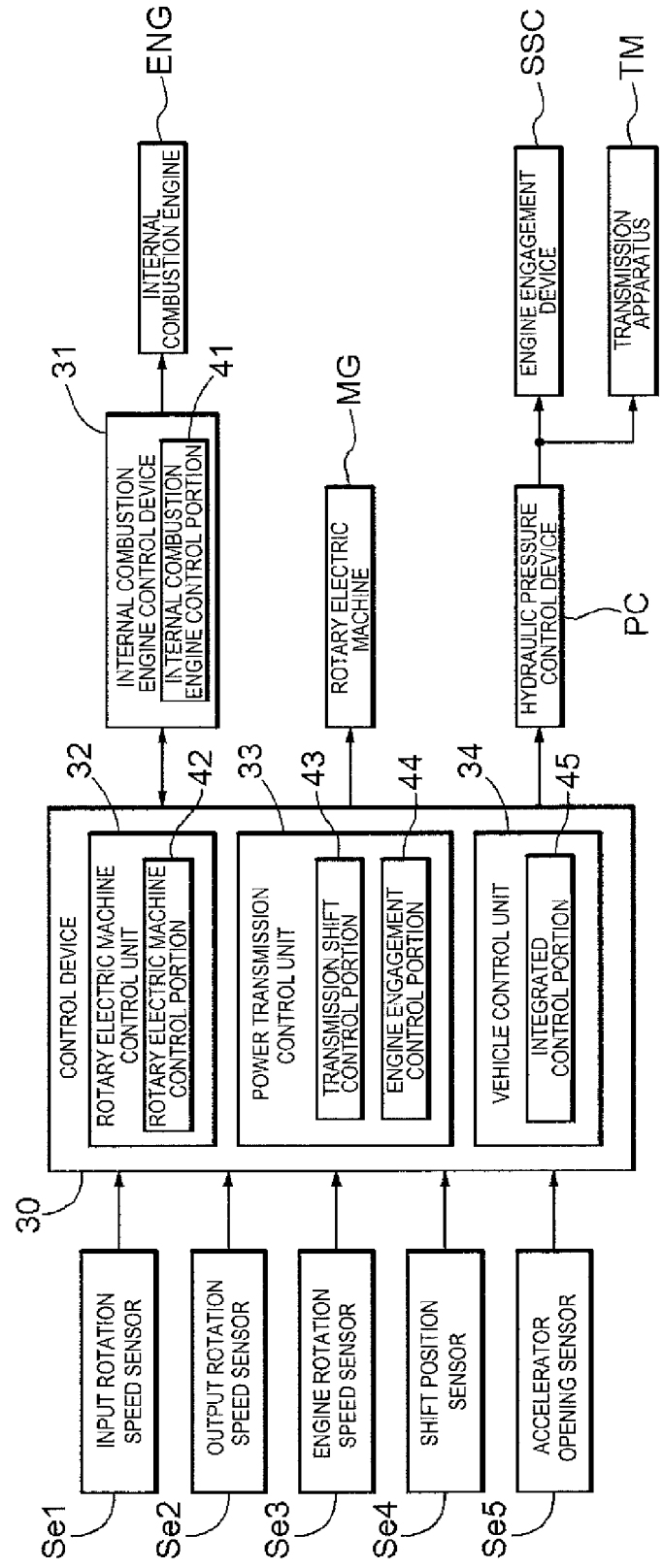
FIG. 2 is a block diagram illustrating the schematic structure of the control device according to the embodiment of the disclosure.

As illustrated in FIG. 2, the control device 30 includes functional portions such as a transmission shift control portion 43 and so on.

The transmission shift control portion 43 performs upshift control for switching to a transmission shift stage having a smaller transmission shift ratio. After starting the upshift control, the transmission shift control portion 43 performs torque phase control for increasing the engagement pressure of the engagement side engagement device to be engaged for switching the transmission shift stage and reducing the engagement pressure of the release side engagement device to be released for switching the transmission shift stage and, after starting the torque phase control, performs inertia phase control for performing a rotation change for increasing a rotation speed difference $\Delta W1$ of the release side engagement device and reducing a rotation speed difference $\Delta W2$ of the engagement side engagement device.

In such a structure, the transmission shift control portion 43 is characterized by performing torque down control for reducing the torque of the driving force source in the inertia phase control and changing the start timing of the torque down control relative to the execution timing of torque phase control according to at least the pre-transmission shift torque, which is the torque of the driving force source before starting the upshift control.

The vehicle driving device 1 and the control device 30 according to the embodiment will be described in detail below.

1. Structure of Vehicle Driving Device 1

First, the structure of the vehicle driving device 1 for a hybrid vehicle according to the embodiment will be described. As illustrated in FIG. 1, the hybrid vehicle is a parallel type hybrid vehicle in which the internal combustion engine ENG and the rotary electric machine MG are included as the driving force sources of the vehicle and the internal combustion engine ENG and the rotary electric machine MG are drivably coupled in series to each other. The hybrid vehicle includes the transmission apparatus TM, changes the rotation speed transferred to the input shaft I of the internal combustion engine ENG and the rotary electric machine MG and converts the torque using the transmission apparatus TM, and transfers the changed rotation speed and the converted torque to an output shaft O.

The internal combustion engine ENG is a thermal engine driven by combustion of a fuel, and may be various types of known internal combustion engines such as, for example, a gasoline engine and a diesel engine. In this example, an engine output shaft Eo of the internal combustion engine ENG such as a crankshaft is selectively drivably coupled to the input shaft I drivably coupled to the rotary electric machine MG via the engine engagement device SSC. That is, the internal combustion engine ENG is selectively drivably coupled to the rotary electric machine MG via the engine engagement device SSC, which is a friction engagement device. In addition, the engine output shaft Eo is provided with a damper (not illustrated) so as to attenuate variations in the output torque and the rotation speed caused by intermittent combustion of the internal combustion engine ENG and to transfer the output torque and the rotation speed to the wheels W.

Figure 3:
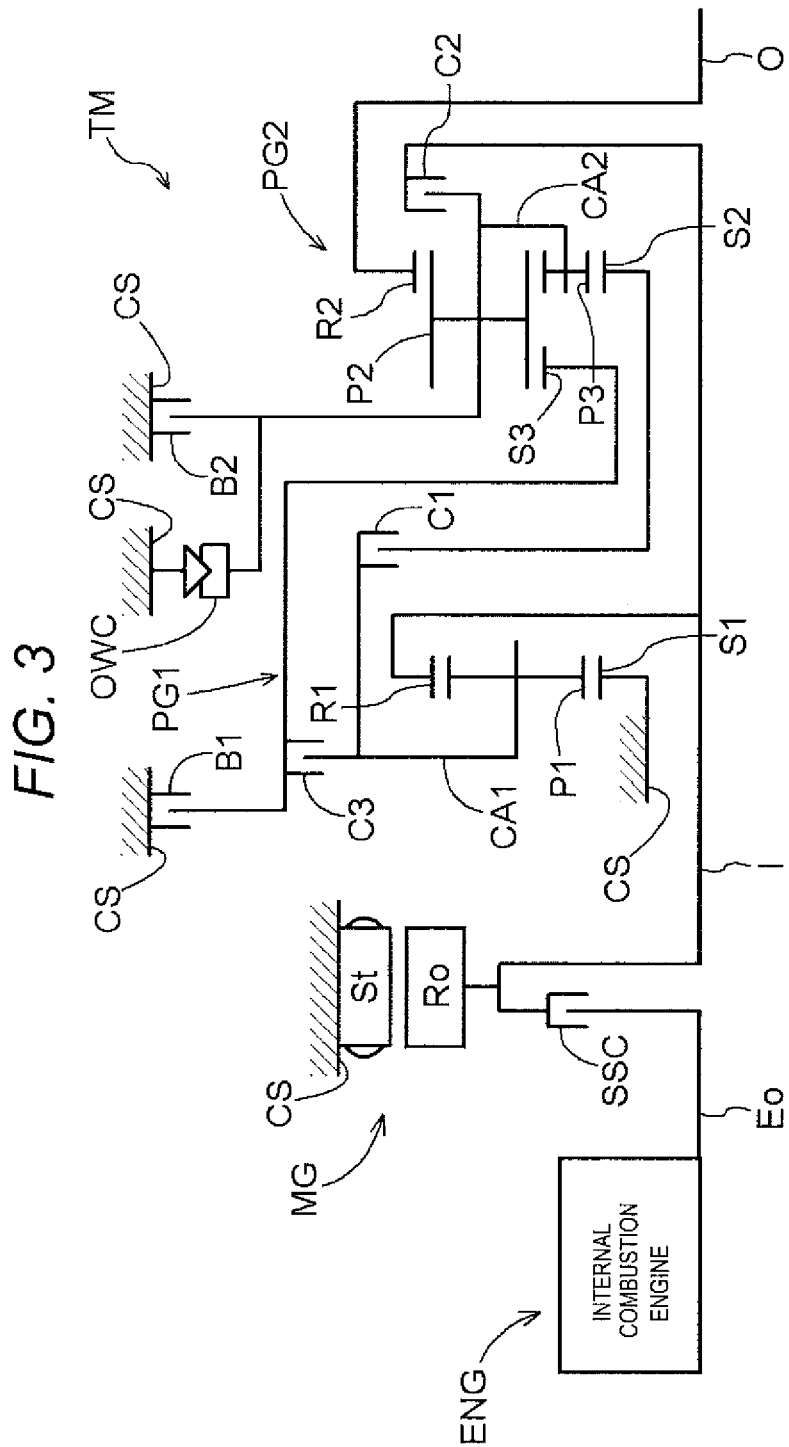
FIG. 3 is a skeleton view illustrating the vehicle driving device according to the embodiment of the disclosure.

The rotary electric machine MG includes a stator St fixed to a case CS for housing the vehicle driving device 1 and a rotor Ro supported rotatably radially inward at a position corresponding to the stator (see FIG. 3). The rotor Ro of the rotary electric machine MG is drivably coupled to the input shaft I so as to rotate integrally with the input shaft I. The rotary electric machine MG is connected to the battery as a storage device via an inverter that performs AC to DC conversion. The rotary electric machine MG can achieve the function of a motor (electric motor) generating power by receiving the supply of electric power and the function of a generator (electric generator) generating electric power by receiving the supply of power. That is, the rotary electric machine MG generates power by receiving the supply of electric power from the battery via the inverter or generates electric power using the rotary driving force transferred from the internal combustion engine ENG and the wheels W and the generated electric power is stored in the battery via the inverter.

The transmission apparatus TM is drivably coupled to the input shaft I to which the driving force source is drivably coupled. In the embodiment, the transmission apparatus TM is a stepped automatic transmission apparatus having a plurality of transmission shift stages having different transmission shift ratios. In order to form the plurality of transmission shift stages, the transmission apparatus TM includes a gear mechanism such as a planetary gear mechanism and a plurality of engagement devices C1, B1, . . . . The transmission apparatus TM changes the rotation speed of the input shaft I and converts the torque of the input shaft I at the transmission shift ratio of each transmission shift stage and transfers the changed rotation speed and the converted torque to the output shaft O. The torque transmitted to the output shaft O from the transmission apparatus TM is distributed to two right and left axles AX via an output differential gear device DF and transferred to the wheels W drivably coupled to the axles AX. The transmission shift ratio represents the ratio of the rotation speed of the input shaft I to the rotation speed of the output shaft O when each transmission shift stage is formed in the transmission apparatus TM and, in this application, the transmission shift ratio represents a value obtained by dividing the rotation speed of the input shaft I by the rotation speed of the output shaft O. That is, the rotation speed obtained by dividing the rotation speed of the input shaft I by the transmission shift ratio represents the rotation speed of the output shaft O. In addition, the torque obtained by multiplying the torque to be transmitted from the input shaft I to the transmission apparatus TM by the transmission shift ratio represents the torque to be transmitted from the transmission apparatus TM to the output shaft O.

Figure 4:
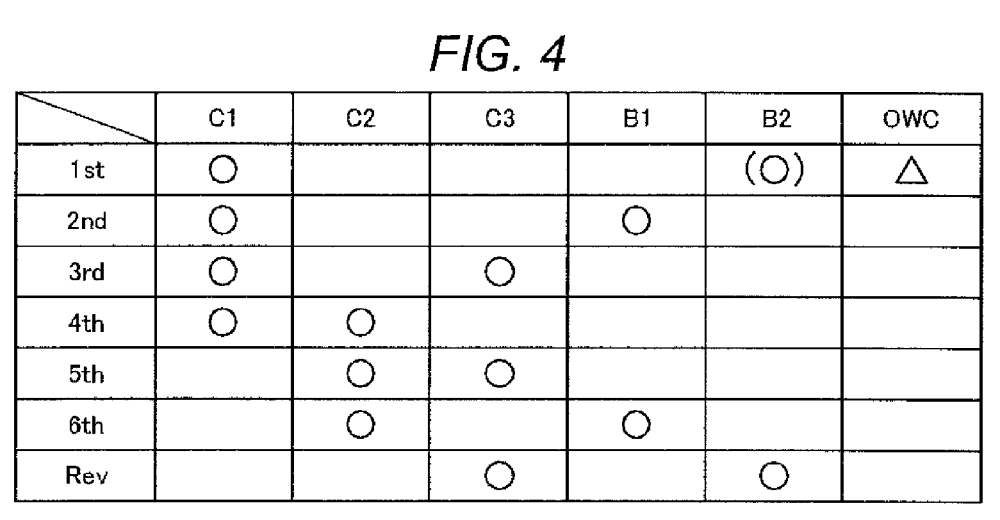

In the embodiment, as shown in the operation table of FIG. 4, the transmission apparatus TM is provided with six transmission shift stages (first stage "1st", second stage "2nd", third stage "3rd", fourth stage "4th", fifth stage "5th", and sixth stage "6th") having different transmission shift ratios (reduction ratios) as forward stages. In order to configure these transmission shift stages, the transmission apparatus TM includes a gear mechanism having a first planetary gear mechanism PG1 and a second planetary gear mechanism PG2 and six engagement devices C1, C2, C3, B1, B2, and OWC. The engagement and release of the plurality of engagement devices C1, B1, . . . except the one-way clutch OWC are controlled to switch the rotating states of rotary elements of the first planetary gear mechanism PG1 and the second planetary gear mechanism PG2 and to selectively engage the plurality of engagement devices C1, B1, . . . , thereby switching between the six transmission shift stages. Note that the transmission apparatus TM has one reverse stage Rev in addition to the above six transmission shift stages.

In FIG. 4, a mark "◯" indicates that the engagement device is in the engagement state and no mark indicates that the engagement device is in the release state. A mark "(◯)" indicates that the engagement device is brought into the engagement state when, for example, engine braking is applied. In addition, a mark "Δ" indicates that the engagement device comes into the release state when the rotary element rotates in one direction and comes into the engagement state when the rotary element rotates in the other direction.

The first stage (1st) is formed when the first clutch C1 and the one-way clutch OWC are engaged. When, for example, engine braking is applied, the first stage is formed by engaging the first clutch C1 and a second brake B2. The second stage (2nd) is formed by engaging the first clutch C1 and the first brake B1. The third stage (3rd) is formed by engaging the first clutch C1 and the third clutch C3. The fourth stage (4th) is formed by engaging the first clutch C1 and the second clutch C2. The fifth stage (5th) is formed by engaging the second clutch C2 and the third clutch C3. The sixth stage (6th) is formed by engaging the second clutch C2 and the first brake B1.

The reverse stage (Rev) is formed by engaging the third clutch C3 and the second brake B2.

These transmission shift stages include the first stage, the second stage, the third stage, the fourth stage, the fifth stage, and the sixth stage in descending order of the transmission shift ratio (reduction ratio) between the input shaft I (internal combustion engine ENG) and the output shaft O.

As illustrated in FIG. 3, the first planetary gear mechanism PG1 is a single pinion type planetary gear mechanism having three rotary elements: a carrier CA1 supporting a plurality of pinion gears P1 and a sun gear S1 and a ring gear R1 engaged with the pinion gears P1. The second planetary gear mechanism PG2 is a Ravigneau type planetary gear mechanism having four rotary elements: two sun gears (first sun gear S2 and second sun gear S3), a ring gear R2, and a common carrier CA2 supporting a long pinion gear P2 engaged with the first sun gear S2 and the ring gear R2 and a short pinion gear P3 engaged with the long pinion gear P2 and the second sun gear S3.

The sun gear S1 of the first planetary gear mechanism PG1 is fixed to the case CS as a non-rotary member. The carrier CA1 is selectively drivably coupled to the second sun gear S3 of the second planetary gear mechanism PG2 by the third clutch C3 so as to rotate integrally with the second sun gear S3, selectively drivably coupled to the first sun gear S2 of the second planetary gear mechanism PG2 by the first clutch C1 so as to rotate integrally with the first sun gear S2, and selectively fixed to the case CS by the first brake B1. The ring gear R1 is drivably coupled to the input shaft I so as to rotate integrally with the input shaft I.

The first sun gear S2 of the second planetary gear mechanism PG2 is selectively drivably coupled to the carrier CA1 of the first planetary gear mechanism PG1 by the first clutch C1 so as to rotate integrally with the carrier CAL The carrier CA2 is selectively drivably coupled to the input shaft I by the second clutch C2 so as to rotate integrally with the input shaft I. The carrier CA2 is also selectively fixed to the case CS as the non-rotary member by the second brake B2 or the one-way clutch OWC. The one-way clutch OWC selectively fixes the carrier CA2 to the case CS by blocking rotation only in one direction. The ring gear R2 is drivably coupled to the output shaft O so as to rotate integrally with the output shaft O. The second sun gear S3 is selectively drivably coupled to the carrier CA1 of the first planetary gear mechanism PG1 by the third clutch C3 so as to rotate integrally with the carrier CAL The second sun gear S3 is also selectively fixed to the case CS by the first brake B1.

In the embodiment, the plurality of engagement devices C1, C2, C3, B1, and B2 except the one-way clutch OWC included in the transmission apparatus TM are friction engagement devices. Specifically, these friction engagement devices include multi-disc clutches and multi-disc brakes that are operated by hydraulic pressure. The engagement states of the engagement devices C1, C2, C3, B1, and B2 are controlled by the hydraulic pressure supplied from a hydraulic pressure control device PC. The engine engagement device SSC is also a friction engagement device.

A friction engagement device transfers a torque between engagement members through friction between the engagement members. When a rotation speed difference (slip) is present between engagement members of a friction engagement device, a torque (slip torque) of the transmission torque capacity is transferred from the member with a higher rotation speed to the member with a lower rotation speed by kinetic friction. When a rotation speed difference (slip) is not present between engagement members of a friction engagement device, the friction engagement device transfers a torque up to the transmission torque capacity applied between the engagement members of the friction engagement device by static friction. The transmission torque capacity is the maximum torque that can be transferred by the friction engagement device via friction. The transmission torque capacity changes in proportion to the engagement pressure of the friction engagement device. The engagement pressure is a pressure (or force) for pushing an input side engagement member (friction disc) and an output side engagement member (friction disc) against each other. In the embodiment, the engagement pressure changes in proportion to the supplied hydraulic pressure. That is, in the embodiment, the transmission torque capacity changes in proportion to the hydraulic pressure supplied to the friction engagement device.

Each of the friction engagement devices has a return spring and is biased to the release side by the reaction force of the spring. When a force caused by the hydraulic pressure supplied to a hydraulic cylinder of each friction engagement device exceeds the reaction force of the spring, a transmission torque capacity starts generating in each friction engagement device and each friction engagement device changes from the release state to the engagement state. The hydraulic pressure at which a transmission torque capacity start generating is referred to as a "stroke end pressure". In each friction engagement device, the transmission torque capacity increases in proportion to an increase in the hydraulic pressure after the supplied hydraulic pressure exceeds the stroke end pressure. The friction engagement device may have no return spring and may be controlled by the difference between the hydraulic pressures applied to both sides of the piston of the hydraulic cylinder.

In the embodiment, the engagement state is a state in which a transmission torque capacity is generated in the engagement device and includes a slip engagement state and a direct engagement state. The release state is a state in which no transmission torque capacity is generated in the engagement device. The slip engagement state is an engagement state in which a rotation speed difference (slip) is present between engagement members of an engagement device and the direct engagement state is an engagement state in which no rotation speed difference (slip) is present between engagement members of an engagement device. In addition, an indirect engagement state is an engagement state other than the direct engagement state and includes the release state and the slip engagement state.

Even when the control device 30 does not issue an instruction for generating a transmission torque capacity to the friction engagement device, a transmission torque capacity may be generated by dragging between engagement members (friction members). For example, even when the piston does not push the friction members against each other, the friction members may contact with each other and the transmission torque capacity may be generated due to the dragging between the friction members. Accordingly, the "release state" includes the state in which a transmission torque capacity is generated by dragging between friction members when the control device 30 does not issue an instruction for generating a transmission torque capacity to the friction engagement device.

2. Structure of Hydraulic Pressure Control System

The hydraulic pressure control system of the vehicle driving device 1 includes the hydraulic pressure control device PC for regulating the hydraulic pressure of working oil supplied from a hydraulic pump driven by a vehicle driving force source or a dedicated motor to a predetermined pressure. The hydraulic pressure control device PC includes a plurality of hydraulic pressure control valves such as linear solenoid valves for regulating the hydraulic pressure supplied to the respective engagement devices C1, B1, . . . , SSC and the like. The hydraulic pressure control valve regulates the openings of the valves according to a signal value of an instructed hydraulic pressure supplied from the control device 30 and supplies the working oil of the hydraulic pressure corresponding to the signal value to the engagement devices C1, B1, . . . , SSC and the like. The signal value supplied to each linear solenoid valve from the control device 30 is a current value. The hydraulic pressure output from each linear solenoid valve is basically proportional to the current value supplied from the control device 30.

The hydraulic pressure control device PC regulates the openings of one or more regulating valves based on a hydraulic pressure (signal pressure) output from the linear solenoid valve for regulating a hydraulic pressure to regulate the amounts of the working oil drained from the regulating valves, and regulates the hydraulic pressures of the working oil to one or more predetermined pressures. The working oil regulated to the predetermined pressures is supplied to the plurality of engagement devices C1, B1 . . . and the engine engagement device SSC included in the transmission apparatus TM with required levels of hydraulic pressures.

3. Structure of Control Device

Next, the structures of the control device 30 for controlling the vehicle driving device 1 and the internal combustion engine control device 31 will be described with reference to FIG. 2.

The control units 32 to 34 of the control device 30 and the internal combustion engine control device 31 each include a calculation processing unit such as a CPU as a core member, and a storage device such as a RAM (random access memory) that can read data from and write data to the calculation processing unit and a ROM (read-only memory) that can read data from the calculation processing unit. In addition, functional portions 41 to 45 and the like of the control device 30 are configured by software (programs) stored in the ROM of the control device, hardware such as a computing circuit provided separately, or both of those software and hardware. In addition, the control units 32 to 34 of the control device 30 and the internal combustion engine control device 31 are configured so as to communicate with each other, share various types of information such as detected information by sensors and control parameters, and perform cooperative control to achieve the functions of the functional portions 41 to 45.

In addition, the vehicle driving device 1 has sensors such as sensors Se1 to Se5 and electric signals output from the sensors are input to the control device 30 and the internal combustion engine control device 31. The control device 30 and the internal combustion engine control device 31 calculate the detected information by the sensors based on the input electric signals.

The input rotation speed sensor Se1 is a sensor for detecting the rotation speed of the input shaft I. Since the rotor Ro of the rotary electric machine MG is drivably coupled to the input shaft I integrally, the control device 30 detects the rotation speed (angular velocity) of the rotary electric machine MG and the rotation speed of the input shaft I based on the input signal from the input rotation speed sensor Se1. The output rotation speed sensor Se2 is a sensor for detecting the rotation speed of the output shaft O. The control device 30 detects the rotation speed (angular velocity) of the output shaft O based on an input signal from the output rotation speed sensor Se2. In addition, since the rotation speed of the output shaft O is proportional to the vehicle speed, the control device 30 calculates the vehicle speed based on an input signal from the output rotation speed sensor Se2. The engine rotation speed sensor Se3 is a sensor for detecting the rotation speed of the engine output shaft Eo (internal combustion engine ENG). The internal combustion engine control device 31 detects the rotation speed (angular velocity) of the internal combustion engine ENG based on an input signal from the engine rotation speed sensor Se3.

The shift position sensor Se4 is a sensor for detecting the selected position (shift position) of the shift lever operated by the driver. The control device 30 detects the shift position based on an input signal from the shift position sensor Se4. In the shift lever, a parking range (P range), reverse travel range (R range), neutral range (N range), forward travel range (D range), or the like can be selected. In addition, in the shift lever, as one type of the D range, a transmission shift stage restriction range such as a 2 range or L range that restrict the range of forward transmission shift stages to be formed can be selected. In addition, in the shift lever, it is possible to operate an "up-shift request switch" requesting the transmission apparatus TM to shift up or a "down-shift request switch" requesting the transmission apparatus TM to shift down when the D range is selected.

The accelerator opening sensor Se5 is a sensor for detecting the amount of operation of an accelerator pedal. The control device 30 detects the accelerator opening based on an input signal from the accelerator opening sensor Se5.

3-1. Vehicle Control Unit 34

The vehicle control unit 34 includes an integrated control portion 45. The integrated control portion 45 integrates various types of torque control performed on the internal combustion engine ENG, the rotary electric machine MG, the transmission apparatus TM, the engine engagement device SSC, and the like and the engagement control of engagement devices and the like as the overall vehicle.

The integrated control portion 45 calculates a vehicle request torque that is a target driving force transferred from the input shaft I side to the output shaft O side, the vehicle request torque being requested for driving the wheels W, according to the accelerator opening, the vehicle speed, and the charge amount of the battery and also determines the operation mode of the internal combustion engine ENG and the rotary electric machine MG. The operation mode includes an electric mode for traveling with only the rotary electric machine MG as the driving force source and a parallel mode for traveling with at least the internal combustion engine ENG as the driving force source. For example, when the accelerator opening is small and the charge amount of the battery is large, the electric mode is selected as the operation mode. Otherwise (that is, when the accelerator opening is large or the charge amount of the battery is small), the parallel mode is selected as the operation mode.

The integrated control portion 45 calculates an internal combustion engine request torque that is an output torque requested for the internal combustion engine ENG, a rotary electric machine request torque that is an output torque requested for the rotary electric machine MG, an instructed hydraulic pressure that is a target of a hydraulic pressure to be supplied to the engine engagement device SSC, and a instructed hydraulic pressure that is a target of a hydraulic pressure to be supplied to the engagement devices C1, B1, . . . of the transmission apparatus TM based on the vehicle request torque, the operation mode, the charge amount in the battery, and the like. Then, the integrated control portion 45 transmits those calculated torques or hydraulic pressures to the other control units 32 and 33 and the internal combustion engine control device 31 to perform the integrated control. Basically, the setting is made so that the sum of the internal combustion engine request torque and the rotary electric machine request torque matches the vehicle request torque.

3-2. Internal Combustion Engine Control Device 31

The internal combustion engine control device 31 has the internal combustion engine control portion 41 that performs the operation control of the internal combustion engine ENG. In the embodiment, when the internal combustion engine request torque is instructed from the integrated control portion 45 or the transmission shift control portion 43, the internal combustion engine control portion 41 performs the torque control so that the internal combustion engine ENG outputs the internal combustion engine request torque.

3-3. Rotary Electric Machine Control Unit 32

The rotary electric machine control unit 32 includes a rotary electric machine control portion 42 that performs the operation control of the rotary electric machine MG. In the embodiment, when the rotary electric machine request torque is instructed from the integrated control portion 45 or the transmission shift control portion 43, the rotary electric machine control portion 42 controls the rotary electric machine MG to output the rotary electric machine request torque. Specifically, the rotary electric machine control portion 42 turns on and off a plurality of switching elements provided in the inverter to control the output torque of the rotary electric machine MG.

3-4. Power Transmission Control Unit 33

The power transmission control unit 33 includes the transmission shift control portion 43 that controls the transmission apparatus TM and an engine engagement control portion 44 that controls the engine engagement device SSC.

3-4-1. Engine Engagement Control Portion 44

The engine engagement control portion 44 controls the engagement state of the engine engagement device SSC. In the embodiment, the engine engagement control portion 44 controls the signal value to be supplied to each linear solenoid valve provided in the hydraulic pressure control device PC so that the hydraulic pressure to be supplied to the engine engagement device SSC matches the instructed hydraulic pressure of the engine engagement device SSC instructed from the integrated control portion 45 or the transmission shift control portion 43.

3-4-2. Transmission Shift Control Portion 43

The transmission shift control portion 43 performs transmission shift control for controlling the engagement and release of the plurality of engagement devices C1, B1, . . . to switch the transmission shift stage formed in the transmission apparatus TM to another.

In the embodiment, the transmission shift control portion 43 determines the target transmission shift stage formed in the transmission apparatus TM based on sensor detected information such as the vehicle speed, the accelerator opening, and the shift position. By controlling the hydraulic pressures supplied to the plurality of engagement devices C1, B1, . . . included in the transmission apparatus TM via the hydraulic pressure control device PC, the transmission shift control portion 43 engages or releases the engagement devices C1, B1, . . . to form the target transmission shift stage in the transmission apparatus TM. Specifically, the transmission shift control portion 43 transfers the hydraulic pressure control device PC about the target hydraulic pressures (instructed hydraulic pressures) of the engagement devices and the hydraulic pressure control device PC supplies the hydraulic pressures corresponding to the transferred target hydraulic pressures (instructed hydraulic pressures) to the engagement devices. In the embodiment, the transmission shift control portion 43 controls the hydraulic pressures to be supplied to the engagement devices by controlling the signal values to be supplied to the linear solenoid valves provided in the hydraulic pressure control device PC.

In the embodiment, the transmission shift control portion 43 determines the target transmission shift stage with reference to a transmission shift map stored in a memory (not illustrated). The transmission shift map defines the relationship among the accelerator opening, the vehicle speed, and the target transmission shift stage in the transmission apparatus TM. A plurality of upshift lines and a plurality of downshift lines are set in the transmission shift map and, when the upshift lines or the downshift lines are crossed in the transmission shift map due to a change in the vehicle speed and the accelerator opening, the transmission shift control portion 43 determines a new target transmission shift stage in the transmission apparatus TM and determines that the transmission shift stage is changed. The transmission shift control portion 43 may change the target transmission shift stage when receiving an upshift request or a downshift request according to a change in the select position (shift position) of the shift lever by the driver. A downshift means a change from a transmission shift stage having a smaller transmission shift ratio to a transmission shift stage having a larger transmission shift ratio and an upshift means a change from a transmission shift stage having a larger transmission shift ratio to a transmission shift stage having a smaller transmission shift ratio.

When performing the shift control for switching the transmission shift stage to another, the transmission shift control portion 43 controls the instructed hydraulic pressure for the engagement devices C1, B1, . . . , engages or releases the engagement devices C1, B1, . . . , and switches the transmission shift stage formed in the transmission apparatus TM to the target transmission shift stage. In this situation, the transmission shift control portion 43 sets the release side engagement device, which is the engagement device to be released for switching the transmission shift stage, and the engagement side engagement device, which is the engagement device to be engaged for switching the transmission shift stage. Then, the transmission shift control portion 43 performs a so-called switching shift in which the release side engagement device is released and the engagement side engagement device is engaged according to a transmission shift control sequence scheduled in advance.

Specifically, the transmission shift control portion 43 sets, as the release side engagement device, the engagement devices not shared with the plurality of engagement devices forming the transmission shift stage after the transmission shift among the plurality of engagement devices forming the transmission shift stage before the transmission shift. The transmission shift control portion 43 sets, as the engagement side engagement device, the engagement device not shared with the plurality of engagement devices forming the transmission shift stage before the transmission shift among the plurality of engagement devices forming the transmission shift stage after the transmission shift.

For example, when the transmission shift stage before the transmission shift is the second stage (2nd), and the transmission shift stage after the transmission shift is the third stage (3rd), as illustrated in FIG. 4, the first brake B1 is set as the release side engagement device and the third clutch C3 is set as the engagement side engagement device.

The engagement side engagement device is released before starting the transmission shift control and engaged during the transmission shift control. The release side engagement device is engaged before starting the transmission shift control and released during the transmission shift control.

During the transmission shift control, the transmission shift control portion 43 calculates, in place of the integrated control portion 45, an internal combustion engine request torque requested for the internal combustion engine ENG, a rotary electric machine request torque requested for the rotary electric machine MG, and instructed hydraulic pressures, which are the targets of hydraulic pressures supplied to the engagement devices C1, B1, . . . of the transmission apparatus TM, instructs them to the other control units 32 and 33 and the internal combustion engine control device 31, and performs integrated control.

3-4-2-1. Upshift Control

The transmission shift control portion 43 performs upshift control for switching to a transmission shift stage having a smaller transmission shift ratio. After starting the upshift control, the transmission shift control portion 43 performs the torque phase control for increasing the engagement pressure of the engagement side engagement device and reducing the engagement pressure of the release side engagement device and, after starting the torque phase control, performs the inertia phase control for performing a rotation change for increasing the rotation speed difference ΔW1 of the release side engagement device and reducing the rotation speed difference ΔW2 of the engagement side engagement device.

<Torque Phase Control>

In the embodiment, in torque phase control, the transmission shift control portion 43 gradually increases the target hydraulic pressure (instructed hydraulic pressure) supplied to the engagement side engagement device to an engagement side reference pressure and gradually reduces the target hydraulic pressure (instructed hydraulic pressure) of the release side engagement device to a stroke end pressure (at which the release side engagement device is put in the release state) or less. In this example, the transmission shift control portion 43 sets the engagement side reference pressure to an engagement pressure (hydraulic pressure) at which the engagement side engagement device can transfer the pre-transmission shift torque (which may be the vehicle request torque) to the output shaft O side. Specifically, the transmission shift control portion 43 calculates the transmission torque capacity of the engagement side engagement device by multiplying the pre-transmission shift torque by the gear ratio of a gear acting on the engagement side engagement device and calculates the target hydraulic pressure (instructed hydraulic pressure) for realizing the calculated transmission torque capacity.

The pre-transmission shift torque is the torque of the driving force source transferred to the input shaft I before starting upshift control (at the start of upshift control in this example). Since the torque of driving force source is controlled so as to basically match the vehicle request torque in the embodiment, the transmission shift control portion 43 may use the vehicle request torque as the pre-transmission shift torque in each control operation of upshift control. In addition, to respond to the case in which the vehicle request torque is changed by the operation of the accelerator pedal or the like during upshift control, the transmission shift control portion 43 may use the current value of the vehicle request torque, which changes one after another according to the accelerator opening, as the pre-transmission shift torque. In any case, when the vehicle request torque is assumed not to change during upshift control, the transmission shift control portion 43 can be expected to perform each control operation of upshift control according to the pre-transmission shift torque.

In torque phase control, the relationship of the torque shifts to the state after the upshift control, but the relationship of the rotation speed is maintained in the state before the upshift control, the engagement side engagement device is put in the slip engagement state, and the release side engagement device is put in the release state.

In the embodiment, the transmission shift control portion 43 gradually reduces the target hydraulic pressure (instructed hydraulic pressure) of the release side engagement device from the release side reference pressure to the stroke end pressure at a predetermined gradient in a predetermined period of torque phase control and gradually increases the target hydraulic pressure (instructed hydraulic pressure) of the engagement side engagement device from the stroke end pressure to the engagement side reference pressure at a predetermined gradient in the same predetermined period of torque phase control. In this example, the transmission shift control portion 43 sets the release side reference pressure to an engagement pressure (hydraulic pressure) at which the release side engagement device can transfer the pre-transmission shift torque (which may be vehicle request torque) to the output shaft O side. Specifically, the transmission shift control portion 43 calculates the transmission torque capacity of the release side engagement device by multiplying the pre-transmission shift torque by the gear ratio of a gear acting on the release side engagement device and calculates the target hydraulic pressure (instructed hydraulic pressure) for realizing the calculated transmission torque capacity.

<Pre-Phase Control>

In the embodiment, the transmission shift control portion 43 performs pre-phase control for changing the engagement pressures of the release side engagement device and the engagement side engagement device in advance for torque phase control before starting torque phase control after starting upshift control.

In pre-phase control, the transmission shift control portion 43 increases the engagement pressure of the engagement side engagement device to the stroke end pressure and reduces the engagement pressure of the release side engagement device from the full engagement pressure to the release side reference pressure. The full engagement pressure represents the maximum engagement pressure (supply hydraulic pressure or instructed hydraulic pressure) set to maintain the engagement state without any slip even if the torque transmitted to the engagement devices from the driving force source varies.

<Inertia Phase Control>

In the inertia phase control, the transmission shift control portion 43 performs a rotation change for increasing the rotation speed difference $\Delta W1$ of the release side engagement device and reducing the rotation speed difference $\Delta W2$ of the engagement side engagement device. For this purpose, the transmission shift control portion 43 reduces the rotation speed of the input shaft I from the pre-transmission shift synchronous rotation speed to the post-transmission shift synchronous rotation speed.

The pre-transmission shift synchronous rotation speed represents the rotation speed of the input shaft I when the rotation speed difference $\Delta W1$ of the release side engagement device is assumed to be zero and the transmission shift control portion 43 multiplies the rotation speed of the output shaft O by the transmission shift ratio of the transmission shift stage before upshift control to calculate the pre-transmission shift synchronous rotation speed. Since the rotation speed difference between the rotation speed of the input shaft I and the pre-transmission shift synchronous rotation speed is proportional to the rotation speed difference $\Delta W1$ of the release side engagement device, the transmission shift control portion 43 determines the rotation speed difference $\Delta W1$ of the release side engagement device based on the rotation speed difference between the rotation speed of the input shaft I and the pre-transmission shift synchronous rotation speed.

In addition, the post-transmission shift synchronous rotation speed represents the rotation speed of the input shaft I when the rotation speed difference $\Delta W2$ of the engagement side engagement device is assumed to be zero and the transmission shift control portion 43 multiplies the rotation speed of the output shaft O by the transmission shift ratio of the transmission shift stage after upshift control to calculate the post-transmission shift synchronous rotation speed. Since the rotation speed difference between the rotation speed of the input shaft I and the post-transmission shift synchronous rotation speed is proportional to the rotation speed difference $\Delta W2$ of the engagement side engagement device, the transmission shift control portion 43 determines the rotation speed difference $\Delta W2$ of the engagement side engagement device based on the rotation speed difference between the rotation speed of the input shaft I and the post-transmission shift synchronous rotation speed.

In inertia phase control, the transmission shift control portion 43 performs torque down control for reducing the torque of the driving force source transferred to the input shaft I. In the embodiment, the transmission shift control portion 43 reduces the torque of the driving force source from the pre-transmission shift torque (which may be the vehicle request torque).

3-4-2-2. Problem with Upshift Control

A problem with upshift control will be described with reference to the time chart of the comparative example illustrated in FIG. 5.

In torque phase control from time T02 to time T03, even when the target hydraulic pressure (instructed hydraulic pressure) of the release side engagement device is reduced to the stroke end pressure or less, the actual hydraulic pressure is reduced late. In the engagement device of the transmission apparatus TM according to the embodiment, the delay in reduction of the hydraulic pressure increases toward a proximity of the stroke end pressure. This is because the engagement device of the transmission apparatus TM according to the embodiment pushes back the hydraulic pressure supplied to the engagement device to the hydraulic pressure control device PC side using the force of the return spring and the residual pressure is released late.

Accordingly, even after (after time T03) the target hydraulic pressure (instructed hydraulic pressure) of the release side engagement device is reduced to the stroke end pressure or less, the actual hydraulic pressure is higher than the stroke end pressure for some time (from time T03 to time T05), a transmission torque capacity is generated, and the release state is not reached.

In contrast, when the hydraulic pressure of the engagement device is increased, since the hydraulic pressure is actively supplied from the hydraulic pressure control device PC, the delay in increase in the actual hydraulic pressure relative to an increase in the target hydraulic pressure (instructed hydraulic pressure) is less than the delay in the case in which the hydraulic pressure is reduced.

As illustrated in the graph for the input side transmission torque, during torque phase control (from time T02 to time T03), the torque of the driving force source transferred to the input shaft I is shared between the engagement side engagement device in the slip engagement state and the release side engagement device in the direct engagement state and transferred to the output shaft O side. Specifically, since the engagement side engagement device is put in the slip engagement state, the torque obtained by multiplying the transmission torque capacity that is gradually increasing by the plus sign (+1) is transferred from the input shaft I to the output shaft O side and the release side engagement device transfers the torque obtained by subtracting the transmission torque of the engagement side engagement device from the torque of the driving force source within the range between the upper limit obtained by multiplying the transmission torque capacity that is gradually reducing by the plus sign and the lower limit obtained by multiplying the transmission torque capacity by the minus sign (−1).

Figure 5:
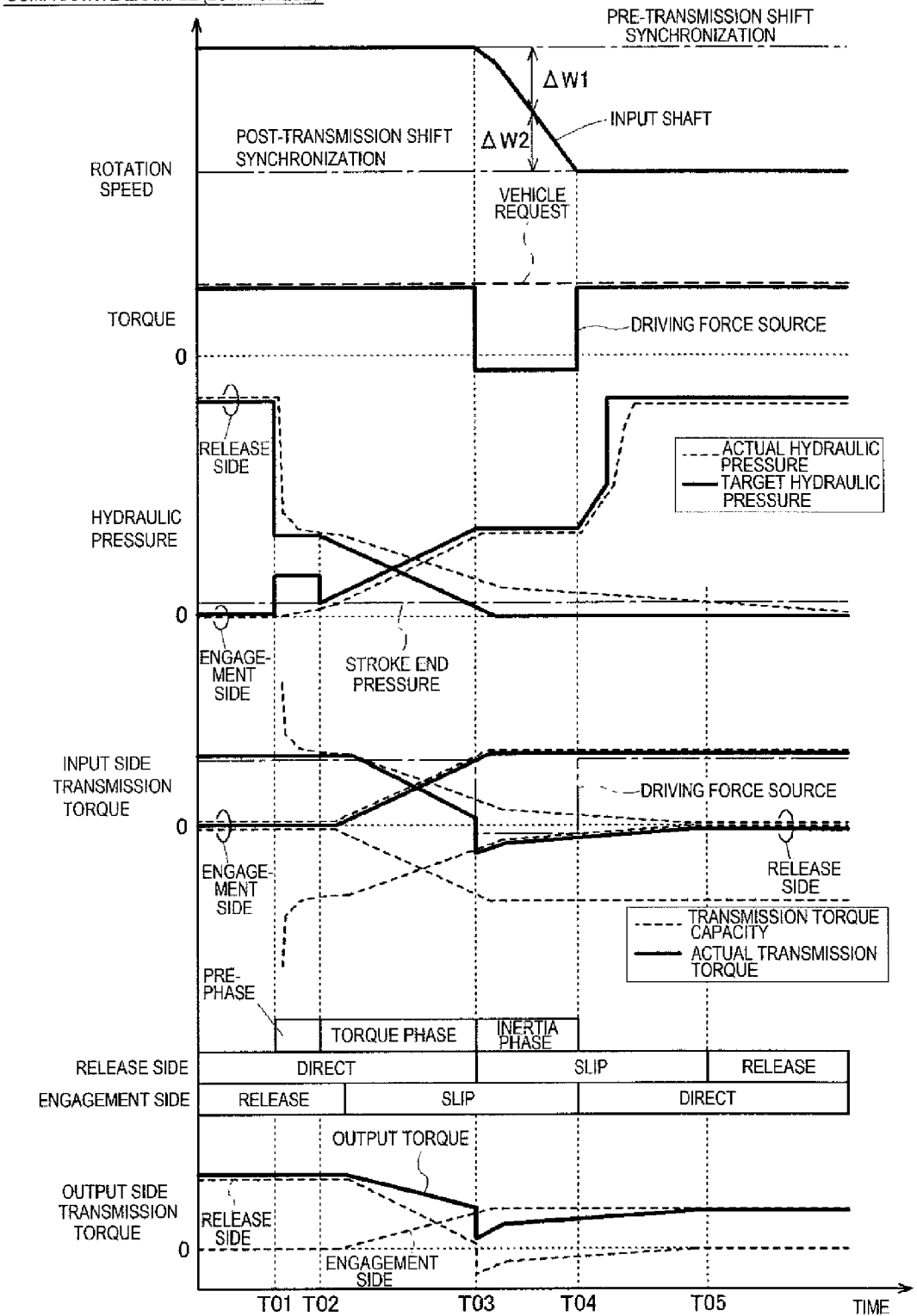
FIG. 5 is a time chart according to a comparative example different from the embodiment of the disclosure.

In the graph for the input side transmission torque in the time chart illustrated in FIG. 5, the transmission torque and the transmission torque capacity of the engagement side engagement device or the release side engagement device indicate the transmission torque (that is, the transmission torque converted based on the input shaft I) and the transmission torque capacity transferred from the input shaft I to the output shaft O side via the engagement side engagement device or the release side engagement device.

In addition, in the graph for the output side transmission torque in the time chart illustrated in FIG. 5, the transmission torque of the engagement side engagement device or release side engagement device indicates the transmission torque (that is, the transmission torque converted based on the output shaft O) transferred from the input shaft I side to the output shaft O via the engagement side engagement device or the release side engagement device.

In the comparative example illustrated in FIG. 5, unlike the embodiment, the torque of the driving force source is reduced in a stepwise manner when (at time T03) the target hydraulic pressure (instructed hydraulic pressure) of the release side engagement device is reduced to the stroke end pressure through torque phase control to start torque down control. Accordingly, the input side transmission torque transferred through the release side engagement device is reduced to the lower limit obtained by multiplying the transmission torque capacity by the minus sign and the slip engagement state is reached (time T03).

Since the input side transmission torque of the release side engagement device is reduced to the lower limit corresponding to the transmission torque capacity, as illustrated in the graph for the output side transmission torque, the torque transferred to the output shaft O via the release side engagement device is significantly reduced (time T03). Accordingly, the output torque obtained by adding the output side transmission torque of the release side engagement device to the output side transmission torque of the engagement side engagement device is significantly reduced (time T03). In the example illustrated in FIG. 5, since the pre-transmission shift torque of the driving force source is low and the torque transferred to the output shaft O is low, the amount of reduction relative to the magnitude of the transmission torque to the output shaft O is large.

Accordingly, when the torque down control of the driving force source is started without considering a reduction delay in the hydraulic pressure of the release side engagement device as in the comparative example, the negative torque corresponding to the transmission torque capacity of the release side engagement device is transferred to the output shaft O via the release side engagement device in which the transmission torque capacity remains and a drop in the torque may be transferred to the output shaft O. In particular, when the torque transferred to the output shaft O is small, a drop in the torque relative to the transmission torque to the output shaft O becomes large and the driver may feel more unnatural.

Therefore, it is desirable to reduce an unnatural feeling of the driver due to a drop in the torque transferred to the output shaft O by performing torque down control in consideration of the reduction delay in the hydraulic pressure of the release side engagement device and the transmission torque to the output shaft O.

3-4-2-3. Torque Down Start Timing Change Control

Accordingly, when performing torque down control for reducing the torque of the driving force source in inertia phase control, the transmission shift control portion 43 changes the start timing of torque down control relative to the execution timing of torque phase control according to at least the pre-transmission shift torque (which may be vehicle request torque) that is the torque of the driving force source before the start of upshift control.

The transmission torque to the output shaft O changes according to the pre-transmission shift torque of the driving force source before the start of upshift control. In the above structure, the start timing of torque down control relative to the execution timing of torque phase control can be appropriately changed depending on the pre-transmission shift torque to reduce an unnatural feeling of the driver due to a drop in the torque transferred to the output shaft O.

In the embodiment, the transmission shift control portion 43 delays the start timing of the torque down control relative to the execution timing of the torque phase control continuously or in a stepwise manner as the pre-transmission shift torque (which may be the vehicle request torque) is reduced.

As described above, the transmission torque to the output shaft O is reduced as the pre-transmission shift torque is reduced and a drop in the torque by the torque down control becomes larger relative to the transmission torque to the output shaft O, so the driver may feel more unnatural. Since the start timing of the torque down control relative to the execution timing of the torque phase control can be delayed as the pre-transmission shift torque is reduced in the above structure, the residual pressure of the release side engagement device at the start of torque down control can be reduced and the transmission torque capacity can be reduced. Accordingly, the magnitude of the negative torque transferred to the output shaft O via the release side engagement device can be reduced by the torque down control as the pre-transmission shift torque is reduced. Accordingly, when the torque transferred to the output shaft O is low, a drop in the torque relative to the transmission torque to the output shaft O can be reduced and the driver feels less unnatural.

Figure 6:
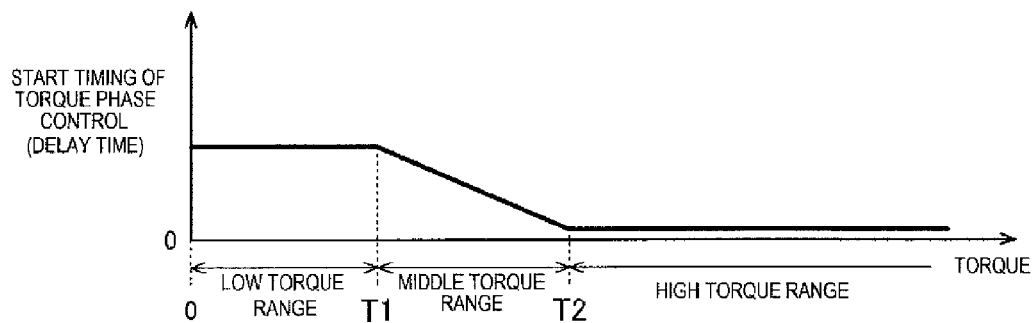
FIG. 6 is a setting map illustrating the start timing of torque down control according to the embodiment of the disclosure.

In the embodiment, the storage device of the control device 30 stores, in advance, a setting map for the start timing as illustrated in FIG. 6 for predetermining the relationship between the pre-transmission shift torque and the start timing of torque down control relative to the execution timing of torque phase control and the transmission shift control portion 43 sets the start timing of torque down control relative to the execution timing of torque phase control based on the pre-transmission shift torque (vehicle request torque) using the setting map for the start timing read from the storage device.

As the start timing of torque down control relative to the execution timing of torque phase control, the delay time from the end point of torque phase control to the start point of torque down control is set. The end point of torque phase control is the time when the target hydraulic pressure (instructed hydraulic pressure) supplied to the engagement side engagement device is increased to the engagement side reference pressure and the target hydraulic pressure (instructed hydraulic pressure) of the release side engagement device is reduced to the stroke end pressure.

In the embodiment, as illustrated in the setting map for the start timing in FIG. 6, when the pre-transmission shift torque is in the low torque range equal to or lower than a predetermined first torque T1, the transmission shift control portion 43 sets the start timing of torque down control relative to the execution timing of torque phase control to a predetermined constant value. When the pre-transmission shift torque is in the high torque range equal to or higher than a predetermined second torque T2, the transmission shift control portion 43 sets the start timing of torque down control relative to the execution timing of torque phase control to a predetermined constant value earlier than the set value in the low torque range. When the pre-transmission shift torque is in the middle torque range between the predetermined first torque T1 and the predetermined second torque T2, the transmission shift control portion 43 sets the start timing of torque down control relative to the execution timing of torque phase control so as to be continuously delayed from the predetermined value in the high torque range to the predetermined value in the low torque range as the pre-transmission shift torque is reduced.

The transmission shift control portion 43 delays the start timing of the torque down control relative to the execution timing of the torque phase control continuously or in a stepwise manner as the transmission shift ratio of the transmission shift stage after the upshift control is reduced.

Since the torque transferred to the output shaft O is reduced as the transmission shift ratio of the transmission shift stage after upshift control is reduced even when the value of the pre-transmission shift torque is the same, the driver may feel more unnatural. In the above structure, by delaying the start timing of torque down control as the transmission shift ratio of the transmission shift stage after the upshift control is reduced, a drop in the torque relative to the transmission torque to the output shaft O can be reduced when the torque transferred to the output shaft O is low and the driver feels less unnatural.

In the embodiment, the storage device of the control device 30 stores, in advance, a setting map for the start timing as illustrated in FIG. 6 for each transmission shift stage after upshift control and, as the transmission shift ratio of the transmission shift stage is reduced, the middle torque range in which the start timing of torque down control changes is set to shift to the low torque side in pre-transmission shift torque.

The start timing of torque down control relative to the execution timing of torque phase control may be changed depending on the transmission shift ratio of the transmission shift stage before upshift control in addition to the transmission shift ratio of the transmission shift stage after upshift control.

Since the transmission shift ratio of transmission shift stage before upshift control is proportional to the torque transferred to the output shaft O via the release side engagement device, as the transmission shift ratio of the transmission shift stage before upshift control is increased, the drop amount of the torque transferred to the output shaft O may be increased even when the residual pressure of the release side engagement device is the same. Accordingly, in the case in which, for example, an upshift is performed with one transmission shift stage skipped, even if the transmission shift ratio of transmission shift stage after upshift control is the same, the start timing of torque down control relative to the execution timing of torque phase control only needs to be delayed as the transmission shift ratio of the transmission shift stage before upshift control is increased.

Alternatively, the transmission shift control portion 43 may delay the start timing of the torque down control relative to the execution timing of the torque phase control continuously or in a stepwise manner as one or both of the transmission shift ratio of the transmission shift stage before the upshift control and the transmission shift ratio of the transmission shift stage after the upshift control are reduced.

<Controlling Changes in Torque Reduction Speed>

In the embodiment, the transmission shift control portion 43 reduces the reduction speed of the torque of the driving force source in the torque down control continuously or in a stepwise manner as the pre-transmission shift torque (which may be the vehicle request torque) is reduced.

In this structure, since the reduction speed of the torque of the driving force source is reduced as the pre-transmission shift torque is reduced, the torque reduction amount of torque down control can be reduced. Accordingly, the magnitude of a negative torque transferred to the output shaft O via the release side engagement device having a residual pressure can be reduced using torque down control. Accordingly, when the torque transferred to the output shaft O is low, a drop in the torque relative to the transmission torque to the output shaft O can be reduced and the driver feels less unnatural.

Figure 7:
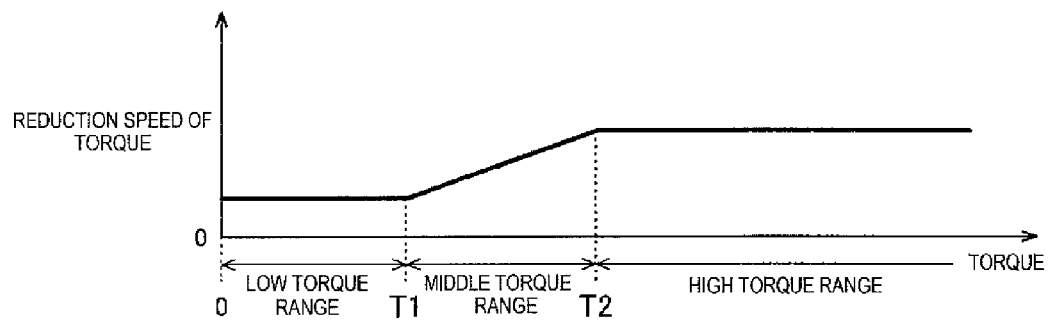
FIG. 7 is a setting map illustrating the reduction speed of the torque of the driving force source according to the embodiment of the disclosure.

In the embodiment, the storage device of the control device 30 stores, in advance, a setting map for the reduction speed predetermining the relationship between the pre-transmission shift torque and the reduction speed of the torque of the driving force source as illustrated in FIG. 7 and the transmission shift control portion 43 sets the reduction speed of the torque of the driving force source based on the pre-transmission shift torque (vehicle request torque) using the setting map for the reduction speed read from the storage device.

In the embodiment, as illustrated in the setting map for the reduction speed in FIG. 7, when the pre-transmission shift torque is in the low torque range equal to or lower than the predetermined first torque T1, the transmission shift control portion 43 sets the reduction speed of the torque of the driving force source to a predetermined constant value. When the pre-transmission shift torque is in the high torque range equal to or higher than the predetermined second torque T2, the transmission shift control portion 43 sets the reduction speed of the torque of the driving force source to a predetermined constant value higher than the set value in the low torque range. When the pre-transmission shift torque is in the middle torque range between the predetermined first torque T1 and the predetermined second torque T2, the transmission shift control portion 43 sets the reduction speed of the torque of the driving force source so that the reduction speed continuously is reduced from the predetermined value in the high torque range to the predetermined value in the low torque range as the pre-transmission shift torque is reduced.

The transmission shift control portion 43 reduces the reduction speed of the torque of the driving force source in the torque down control continuously or in a stepwise manner as the transmission shift ratio of the transmission shift stage after the upshift control is reduced.

In the embodiment, the storage device of the control device 30 stores, in advance, a setting map for the reduction speed as illustrated in FIG. 7 for each transmission shift stage after upshift control and, as the transmission shift ratio of the transmission shift stage is reduced, the middle torque range in which the reduction speed of the torque of the driving force source changes is set to shift to the low torque side in the pre-transmission shift torque.

The reduction speed of the driving force source may be changed depending on the transmission shift ratio of the transmission shift stage before upshift control in addition to the transmission shift ratio of the transmission shift stage after upshift control.

<Gradual Torque Down Control and Rapid Torque Down Control>

In the embodiment, as torque down control, the transmission shift control portion 43 performs gradual torque down control for gradually reducing the torque of the driving force source after starting the torque down control, ends the gradual torque down control after the rotation speed difference $\Delta W1$ of the release side engagement device is caused, and performs rapid torque down control for reducing the torque of the driving force source at a speed faster than in gradual torque down control.

In addition, the transmission shift control portion 43 delays the start timing of the gradual torque down control relative to the execution timing of the torque phase control continuously or in a stepwise manner as the pre-transmission shift torque (which may be the vehicle request torque) is reduced. In addition, the transmission shift control portion 43 reduces the reduction speed of the torque of the driving force source in the gradual torque down control continuously or in a stepwise manner as the pre-transmission shift torque (which may be the vehicle request torque) is reduced.

In the embodiment, the transmission shift control portion 43 starts rapid torque down control when the rotation speed difference ΔW1 of the release side engagement device becomes equal to or more than a predetermined start determination speed difference. After starting rapid torque down control, the transmission shift control portion 43 reduces (stepwise manner, for example) the torque of the driving force source to a torque lower than the pre-transmission shift torque (which may be the vehicle request torque) by a predetermined torque reduction amount at a speed faster than in gradual torque down control. In the embodiment, the transmission shift control portion 43 reduces the output torque of the rotary electric machine MG as reduction in the torque of the driving force source. However, as reduction in the torque of the driving force source, the transmission shift control portion 43 may reduce the output torque of the internal combustion engine ENG or may reduce the output torque of the internal combustion engine ENG and the output torque of the rotary electric machine MG in a shared manner. Alternatively, the transmission shift control portion 43 may reduce the output torque of the rotary electric machine MG in the electric mode in which the engine engagement device SSC is put in the release state. In addition, transmission shift control portion 43 may change the torque reduction amount according to a change in the rotation speed difference ΔW2 of the engagement side engagement device.

When the rotation speed difference ΔW2 of the engagement side engagement device becomes equal to or less than a predetermined end determination speed, the transmission shift control portion 43 ends the torque down control and increases the torque of the driving force source to the pre-transmission shift torque (which may be the vehicle request torque). In addition, the transmission shift control portion 43 increases the engagement pressure of the engagement side engagement device to the full engagement pressure and ends the upshift control.

<Engagement Pressure Increase Control>

However, if the start timing of torque down control relative to the execution timing of torque phase control is delayed or the reduction speed of the torque of the driving force source in torque down control is reduced as the pre-transmission shift torque is reduced, the timing at which the release side engagement device having a residual pressure shifts from the direct engagement state to the slip engagement state delays, thereby possibly delaying the end timing of inertia phase control.

Accordingly, after starting inertia phase control, the transmission shift control portion 43 performs engagement pressure increase control for temporarily increasing the engagement pressure of the engagement side engagement device and changes the temporary increase amount of the engagement pressure in the engagement pressure increase control according to the pre-transmission shift torque. In this structure, the temporary increase amount of the engagement pressure can be appropriately changed depending on the pre-transmission shift torque to reduce an unnatural feeling of the driver.

In the embodiment, the transmission shift control portion 43 increases the temporary increase amount of the engagement pressure in engagement pressure increase control continuously or in a stepwise manner as the pre-transmission shift torque (which may be the vehicle request torque) is reduced.

In the above description, "temporarily increasing the engagement pressure" specifically means that the transmission shift control portion 43 increases the engagement pressure of the engagement side engagement device and then reduces the engagement pressure and the "temporary increase amount of the engagement pressure" means the maximum increase amount when the reduced engagement pressure is assumed to be the reference pressure. That is, the transmission shift control portion 43 assumes the reduced engagement pressure to be the reference pressure, increases the engagement pressure of the engagement side engagement device to a value more than the reference pressure, and then reduces the engagement pressure to the reference pressure.

In the embodiment, the reference pressure as the reduced engagement pressure is set to the engagement side reference pressure described above.

An increase in the transmission torque of the engagement side engagement device in the engagement pressure increase control can reduce the transmission torque of the release side engagement device. Then, when the transmission torque of the release side engagement device is reduced to a lower limit obtained by multiplying the transmission torque capacity of the release side engagement device by the minus sign, the release side engagement device shifts to the slip engagement state and can start a rotation change. Accordingly, it is possible to suppress the delay of the timing at which the release side engagement device shifts to the slip engagement state by increasing the temporary increase amount of the engagement pressure through engagement pressure increase control.

In addition, since the increase in the engagement pressure of the engagement side engagement device is temporary, the increased engagement pressure of the engagement side engagement device can be reduced according to the residual pressure of the release side engagement device that reduces over time.

In addition, if the engagement pressure of the engagement side engagement device is temporarily increased through engagement pressure increase control, the torque transferred to the output shaft O via the engagement side engagement device can be increased temporarily. An increase in the transmission torque to the output shaft O in engagement pressure increase control can cancel a negative torque transferred to the output shaft O via the release side engagement device and the driver feels less unnatural.

In the embodiment, the transmission shift control portion 43 increases the target hydraulic pressure (instructed hydraulic pressure) of the engagement side engagement device to the engagement side reference pressure in torque phase control and then starts engagement pressure increase control. After starting engagement pressure increase control, the transmission shift control portion 43 gradually increases the target hydraulic pressure (instructed hydraulic pressure) of the engagement side engagement device by a set temporary increase amount from the engagement side reference pressure. Then, the transmission shift control portion 43 increases the target hydraulic pressure (instructed hydraulic pressure) of the engagement side engagement device by the temporary increase amount and gradually reduces the target hydraulic pressure to the engagement side reference pressure. The engagement pressure of the engagement side engagement device reduced through engagement pressure increase control may be defined as the engagement side reference pressure.

The transmission shift control portion 43 reduces the magnitude of the reduction speed of the target hydraulic pressure (instructed hydraulic pressure) in engagement pressure increase control to a value lower than the magnitude of the increase speed of the target hydraulic pressure (instructed hydraulic pressure) in engagement pressure increase control and torque phase control. In addition, the transmission shift control portion 43 sets the reduction speed of the target hydraulic pressure (instructed hydraulic pressure) in engagement pressure increase control to a speed corresponding to the reduction speed of the residual pressure of the release side engagement device.

Accordingly, when the residual pressure is present in the release side engagement device, even if the release side engagement device shifts from the direct engagement state to the slip engagement state through engagement pressure increase control or the like and the transmission torque of the release side engagement device is reduced to a negative torque corresponding to the transmission torque capacity generated by a residual pressure, it is possible to suppress reduction in the transmission torque to the output shaft O by canceling the negative transmission torque of the release side engagement device using the transmission torque of the engagement side engagement device increased through engagement pressure increase control.

Figure 8:
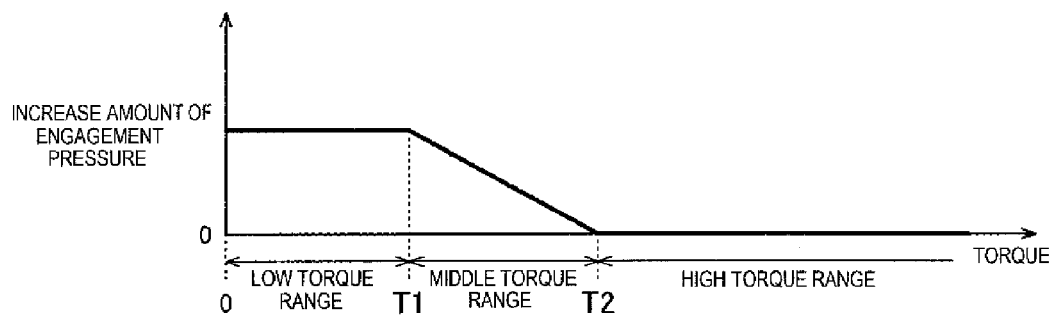
FIG. 8 is a setting map illustrating the temporary increase amount of an engagement pressure according to the embodiment of the disclosure.

In the embodiment, the storage device of the control device 30 stores, in advance, a setting map for the increase amount predetermining the relationship between the pre-transmission shift torque and the temporary increase amount of the engagement pressure as illustrated in FIG. 8 and the transmission shift control portion 43 sets the temporary increase amount of the engagement pressure based on the pre-transmission shift torque (vehicle request torque) using the setting map for the increase amount read from the storage device.

In the embodiment, as illustrated in the setting map for the increase amount in FIG. 8, when the pre-transmission shift torque is in the low torque range equal to or lower than the predetermined first torque T1, the transmission shift control portion 43 sets the temporary increase amount of the engagement pressure to a predetermined constant value. When the pre-transmission shift torque is in the high torque range equal to or higher than the predetermined second torque T2, the transmission shift control portion 43 sets the temporary increase amount of the engagement pressure to a predetermined constant value lower than the set value in the low torque range. When the pre-transmission shift torque is in the middle torque range between the predetermined first torque T1 and the predetermined second torque T2, the transmission shift control portion 43 make setting so that the temporary increase amount of the engagement pressure continuously increases from the predetermined value in the high torque range to the predetermined value in the low torque range as the pre-transmission shift torque is reduced.

In the example illustrated in FIG. 8, since the temporary increase amount of the engagement pressure is set to zero in the high torque range, engagement pressure increase control is not performed. However, engagement pressure increase control may be performed by setting the temporary increase amount of the engagement pressure to a value larger than zero in the high torque range.

The transmission shift control portion 43 increases the temporary increase amount of the engagement pressure in the engagement pressure increase control continuously or in a stepwise manner as the transmission shift ratio of the transmission shift stage after the upshift control is reduced.

In the embodiment, the storage device of the control device 30 stores, in advance, a setting map for the increase amount as illustrated in FIG. 8 for each transmission shift stage after upshift control and, as the transmission shift ratio of the transmission shift stage is reduced, the middle torque range in which the temporary increase amount of the engagement pressure changes is set to shift to the low torque side in pre-transmission shift torque.

The temporary increase amount of the engagement pressure may be changed depending on the transmission shift ratio of the transmission shift stage before upshift control in addition to the transmission shift ratio of the transmission shift stage after upshift control.

The transmission shift control portion 43 may increase a temporary increase amount of the engagement pressure in the engagement pressure increase control continuously or in a stepwise manner as one or both of the transmission shift ratio of the transmission shift stage before the upshift control and the transmission shift ratio of the transmission shift stage after the upshift control are increased.

3-4-2-4. Flowchart

Figure 9:
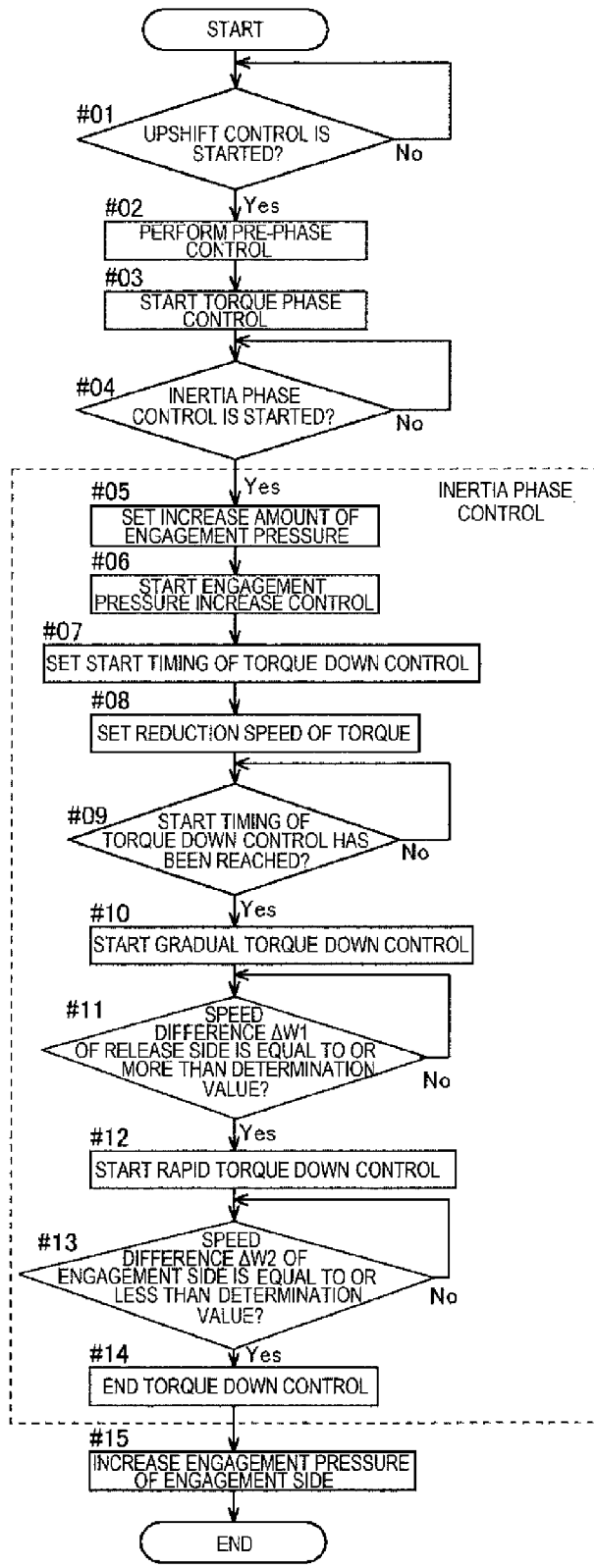
FIG. 9 is a flowchart illustrating upshift control according to the embodiment of the disclosure.

Next, the processing of upshift control will be described with reference to the flowchart in FIG. 9.

First, the transmission shift control portion 43 determines whether the start condition for upshift control is met (step #01). When the start condition for upshift control is met (Yes in step #01), the transmission shift control portion 43 performs pre-phase control for changing the engagement pressures of the release side engagement device and the engagement side engagement device in advance, as described above (step #02). Then, transmission shift control portion 43 starts torque phase control for increasing the engagement pressure of the engagement side engagement device and reducing the engagement pressure of the release side engagement device as described above after performing pre-phase control (step #03).

After starting torque phase control, the transmission shift control portion 43 starts inertia phase control when the start condition for inertia phase control is met (Yes in step #04).

In the embodiment, the transmission shift control portion 43 determines that the start condition for inertia phase control is met when the target hydraulic pressure (instructed hydraulic pressure) supplied to the engagement side engagement device is increased to an engagement side reference pressure and the target hydraulic pressure (instructed hydraulic pressure) of the release side engagement device is reduced to a stroke end pressure (torque phase control ends).

After starting inertia phase control, the transmission shift control portion 43 sets the temporary increase amount of the engagement pressure of the engagement side engagement device based on the pre-transmission shift torque and the like as described above (step #05). Then, the transmission shift control portion 43 starts engagement pressure increase control as described above (step #06).

In addition, after starting inertia phase control, the transmission shift control portion 43 sets the start timing of torque down control relative to the execution timing of torque phase control based on the pre-transmission shift torque and the like as described above (step #07). In the embodiment, as the start timing of torque down control relative to the execution timing of torque phase control, the delay time from the end point of torque phase control to the start point of torque down control is set.

The transmission shift control portion 43 sets the reduction speed of the torque of the driving force source in torque down control (gradual torque down control) based on the pre-transmission shift torque and the like as described above (step #08).

When determining that the delay time set from the end point of torque phase control has elapsed and the start timing of torque down control has been reached (step #09), the transmission shift control portion 43 starts gradual torque down control (step #10) based on the set reduction speed.

The transmission shift control portion 43 starts rapid torque down control (step #12) when the rotation speed difference ΔW1 of the release side engagement device becomes equal to or more than a predetermined start determination speed difference (Yes in step #11).

When the rotation speed difference ΔW2 of the engagement side engagement device becomes equal to or less than a predetermined end determination speed difference after starting rapid torque down control (Yes in step #13), the transmission shift control portion 43 ends torque down control and increases the torque of the driving force source to the pre-transmission shift torque (step #14).

In addition, the transmission shift control portion 43 increases the engagement pressure of the engagement side engagement device to the full engagement pressure (step #15) and ends the upshift control.

3-4-2-5. Example of Control Behavior

Figure 10:
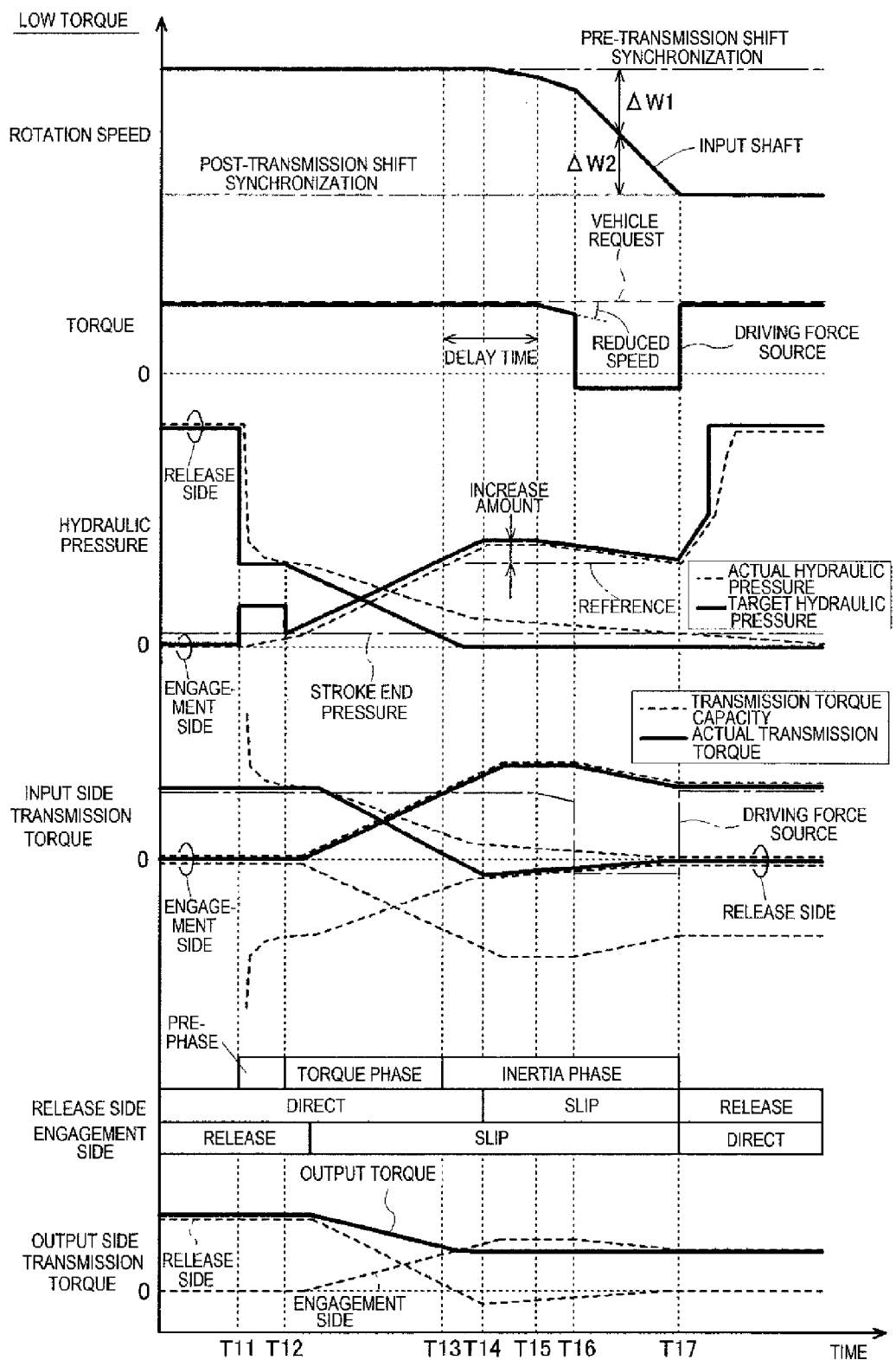
FIG. 10 is a time chart in the case of a low torque range according to the embodiment of the disclosure.

Next, an example of the control behavior of upshift control will be described. FIG. 10 illustrates the control behavior in the case in which the pre-transmission shift torque is in the low torque range in FIGS. 6 to 8, FIG. 11 illustrates the control behavior in the case in which the pre-transmission shift torque is approximately in the middle in the middle torque range, and FIG. 12 illustrates the control behavior in the case in which the pre-transmission shift torque is in the high torque range.

3-4-2-5-1. Low Torque Range

The case in which the pre-transmission shift torque is in the low torque range will be described with reference to FIG. 10.

The transmission shift control portion 43 determines that upshift control is to be started since the target transmission shift stage is changed to a transmission shift stage having a smaller transmission shift ratio at time T11 in the state in which the driving force source transfers the torque corresponding to the vehicle request torque to the input shaft I. The target transmission shift stage is changed when, for example, an upshift line is crossed due to an increase in the vehicle speed or when the shift position is changed.

The pre-transmission shift torque, which is the torque of driving force source at the start (time T11) of upshift control, belongs to the low torque range in FIGS. 6 to 8.

<Pre-Phase>

In the period from time T11 to time T12, the transmission shift control portion 43 performs pre-phase control and changes the engagement pressures of the release side engagement device and the engagement side engagement device in advance.

In the period from time T11 to time T12, the transmission shift control portion 43 reduces the target hydraulic pressure (instructed hydraulic pressure) of the release side engagement device from the full engagement pressure to the release side reference pressure and increases the target hydraulic pressure (instructed hydraulic pressure) of the engagement side engagement device to the stroke end pressure. In order to advance a rise in the supply hydraulic pressure of the engagement side engagement device, the target hydraulic pressure of the engagement side engagement device is temporarily increased in a stepwise manner. The release side reference pressure is set to an engagement pressure (hydraulic pressure) at which the release side engagement device can transfer the pre-transmission shift torque (vehicle request torque) to the output shaft O side.

<Torque Phase>

After performing pre-phase control, the transmission shift control portion 43 performs torque phase control in the period of torque phase control from time T12 to time T13. Specifically, in the period from time T12 to time T13, the transmission shift control portion 43 increases the target hydraulic pressure (instructed hydraulic pressure) of the engagement side engagement device from the stroke end pressure to the engagement side reference pressure at a predetermined gradient and reduces the target hydraulic pressure (instructed hydraulic pressure) of the release side engagement device from the release side reference pressure to the stroke end pressure at a predetermined gradient. The engagement side reference pressure is set to an engagement pressure (hydraulic pressure) at which the engagement side engagement device can transfer the pre-transmission shift torque (which may be the vehicle request torque) to the output shaft O side.

As illustrated in the graph for the hydraulic pressure, the actual hydraulic pressure is reduced late even when the target hydraulic pressure (instructed hydraulic pressure) of the release side engagement device is reduced to the stroke end pressure, and the delay in reduction in the hydraulic pressure becomes larger toward the vicinity of the stroke end pressure. This is because the force of the return spring pushes back the hydraulic pressure to the hydraulic pressure control device PC side and the release of the residual pressure is gradually delayed.

Accordingly, even after (after time T13) the target hydraulic pressure (instructed hydraulic pressure) of the release side engagement device is reduced to the stroke end pressure or less, the actual hydraulic pressure is higher than the stroke end pressure for some time (from time T13 to time T17), a transmission torque capacity is generated, and the release state is not reached.

In contrast, the delay in an increase in the actual hydraulic pressure relative to an increase in the target hydraulic pressure (instructed hydraulic pressure) of the engagement side engagement device is smaller than the delay in the release side engagement device since the hydraulic pressure control device PC actively supplies the hydraulic pressure.

As illustrated in the graph for the input side transmission torque, when the actual hydraulic pressure of the engagement side engagement device exceeds the stroke end pressure, a transmission torque capacity starts to be generated and the transmission torque capacity increases in proportion to an increase in the actual hydraulic pressure (from time T12 to time T13). The engagement side engagement device is put in the slip engagement state and the torque obtained by multiplying the transmission torque capacity of the engagement side engagement device by the plus sign (+1) is transferred from the input shaft I to the output shaft O side via the engagement side engagement device.

The torque transferred from the input shaft I to the output shaft O side via the engagement side engagement device or the release side engagement device is assumed to be the input side transmission torque. In the graphs for the input side transmission torque in the time charts illustrated in FIGS. 10 to 12, the transmission torque and the transmission torque capacity of the engagement side engagement device or the release side engagement device indicate the transmission torque (that is, the transmission torque converted based on the input shaft I) and the transmission torque capacity transferred from the input shaft I to the output shaft O side via the engagement side engagement device or the release side engagement device.

In contrast, the transmission torque capacity of the release side engagement device is reduced in proportion to the actual hydraulic pressure that is reduced late with respect to reduction in the target hydraulic pressure (time T12 and later).

The release side engagement device is in the direct engagement state and transfers a torque acting from the input shaft I to the release side engagement device between the upper limit obtained by multiplying the transmission torque capacity of the release side engagement device by the plus sign and the lower limit obtained by multiplying the transmission torque capacity by the minus sign. The torque obtained by subtracting the input side transmission torque of the engagement side engagement device from the torque of the driving force source acts on the release side engagement device and the release side engagement device transfers the torque obtained by the subtraction from the input shaft I to the output shaft O side between the upper and lower limits of the transmission torque capacity of the release side engagement device (from time T12 to time T14).

As described above, since the reduction delay in the actual hydraulic pressure of the release side engagement device is larger than the increase delay in the actual hydraulic pressure of the engagement side engagement device, the torque obtained by subtracting the input side transmission torque of the engagement side engagement device from the torque of the driving force source falls within the range between the upper and lower limits of the transmission torque capacity of the release side engagement device and the direct engagement state is maintained. In this state, the torque obtained by subtracting the input side transmission torque of the engagement side engagement device and the input side transmission torque of the release side engagement device from the torque of the driving force source is zero.

As illustrated in the graph for the output side transmission torque, the torque obtained by multiplying the input side transmission torque of the engagement side engagement device by the transmission shift ratio of the transmission shift stage after upshift control is transferred to the output shaft O via the engagement side engagement device and the torque obtained by multiplying the input side transmission torque of the release side engagement device by the transmission shift ratio of the transmission shift stage before upshift control is transferred to the output shaft O via the release side engagement device.

The torque transferred from the input shaft I side to the output shaft O via the engagement side engagement device or the release side engagement device is assumed to be the output side transmission torque. In addition, in the graphs for the output side transmission torque in the time charts illustrated in FIGS. 10 to 12, the transmission torque of the engagement side engagement device or the release side engagement device indicates the transmission torque (that is, the transmission torque converted based on the output shaft O) transferred from the input shaft I side to the output shaft O via the engagement side engagement device or the release side engagement device.

Since the transmission shift ratio of the transmission shift stage after upshift control is smaller than the transmission shift ratio of the transmission shift stage before upshift control, the output side transmission torque of the engagement side engagement device is lower than the output side transmission torque of the release side engagement device in the case of the same input side transmission torque. The sum of the output side transmission torque of the engagement side engagement device and the output side transmission torque of the release side engagement device is the total torque (output torque) transferred to the output shaft O.

<Inertia Phase Control>

The transmission shift control portion 43 increases the target hydraulic pressure (instructed hydraulic pressure) supplied to the engagement side engagement device to the engagement side reference pressure, reduces the target hydraulic pressure (instructed hydraulic pressure) of the release side engagement device to the stroke end pressure (ends torque phase control), and then starts inertia phase control (time T13).

After starting inertia phase control, the transmission shift control portion 43 starts the engagement pressure increase control, gradually increases the target hydraulic pressure (instructed hydraulic pressure) of the engagement side engagement device from the engagement side reference pressure by the temporary increase amount of the engagement pressure, and gradually reduces the target hydraulic pressure to the engagement side reference pressure (from time T13 to time T17). In the example illustrated in FIG. 10, since the pre-transmission shift torque belongs to the low torque range, the temporary increase amount of the engagement pressure is set to a relatively large value.

In contrast, since the pre-transmission shift torque belongs to the low torque range, the delay time (from time T13 to time T15) from the end point of torque phase control to the start point of torque down control is set to a large value. Accordingly, after the engagement pressure increase control is started, torque down control is not started for some time.

As the target hydraulic pressure of the engagement side engagement device is increased to a value more than the engagement side reference pressure through engagement pressure increase control, the input side transmission torque of the engagement side engagement device is increased to a value more than the torque of the driving force source. Accordingly, the torque obtained by subtracting the input side transmission torque of the engagement side engagement device from the torque of the driving force source is a negative torque and the input side transmission torque of the release side engagement device becomes lower than zero (time T13 to time T14).

If the input side transmission torque of the release side engagement device is reduced to the lower limit obtained by multiplying the transmission torque capacity of the release side engagement device by the minus sign (time T14), the release side engagement device cannot transfer all of the affected torque, a slip starts occurring between engagement members, and the direct engagement state shifts to the slip engagement state (time T14 and later). When the slip engagement state is reached, the torque obtained by multiplying the transmission torque capacity of the release side engagement device by the minus sign is transferred from the input shaft I to the output shaft O side via the release side engagement device.

As described above, since the increase amount of the input side transmission torque of the engagement side engagement device through engagement pressure increase control is set to a value larger than in the input side transmission torque corresponding to the transmission torque capacity by the residual pressure of the release side engagement device in the low torque range, the release side engagement device can shift to the slip engagement state through engagement pressure increase control.

When the release side engagement device is put in the slip engagement state, the torque acting on the input shaft I obtained by subtracting the input side transmission torque of the engagement side engagement device and the input side transmission torque of the release side engagement device from the torque of the driving force source is a negative torque smaller than zero and the rotation speed of the input shaft I starts reducing from the pre-transmission shift synchronous rotation speed (time T14 and later).

As described above, to shift to the slip engagement state in the state in which a residual pressure is present in the release side engagement device, the input side transmission torque of the release side engagement device needs to be reduced to a lower limit obtained by multiplying the transmission torque capacity due to the residual pressure by the minus sign and the output side transmission torque of the release side engagement device is reduced to a negative torque smaller than zero.

However, reduction in the output torque can be suppressed by canceling the output side transmission torque (which becomes a negative torque) of the release side engagement device using the output side transmission torque of the engagement side engagement device increased by engagement pressure increase control. At this time, in the input side transmission torque reference, the transmission torque of the engagement side engagement device is larger than the transmission torque of the release side engagement device, but the transmission shift ratio of the transmission shift stage after upshift control is smaller than the transmission shift ratio of the transmission shift stage before upshift control. Accordingly, in the output side transmission torque reference, the transmission torque of the release side engagement device can be canceled appropriately by balancing the transmission torque of the engagement side engagement device with the transmission torque of the release side engagement device and the driver feels less unnatural. Conversely, the increase amount of engagement pressure increase control is adjusted and set in advance so that the transmission torque of the release side engagement device can be canceled appropriately in the output side transmission torque reference in this way.

After a lapse of the delay time of the start of torque down control, the transmission shift control portion 43 starts gradual torque down control (time T15). Since the pre-transmission shift torque belongs to the low torque range, the reduction speed of the torque of the driving force source is set to a small value.

In the example illustrated in FIG. 10, at the start point (time T15) of gradual torque down control, the release side engagement device is already in the slip engagement state and transfers the negative torque corresponding to the transmission torque capacity, so the input side transmission torque of the release side engagement device is not changed by gradual torque down control. However, the reduction amount of the torque of the driving force source by gradual torque down control affects the inertia system of the input shaft I and the reduction speed of the rotation speed of the input shaft I is increased (from time T15 to time T16).

Unlike the example illustrated in FIG. 10, since the reduction speed of the torque of the driving force source is small even when the release side engagement device is not in the slip engagement state, reduction in the input side transmission torque of the release side engagement device can be made gentle and the driver feels less unnatural.

In contrast, since the delay time of the start of torque down control is set to a large value and the reduction speed of the torque of the driving force source is set to a small value, the delay until a rotation change occurs after the start of inertia phase control is larger than in the comparative example in FIG. 5. However, even when the pre-transmission shift torque is small as in the above example, a drop in the transmission torque to the output shaft O can be significantly suppressed and the driver feels less unnatural as a whole.

When the pre-transmission shift torque is small as described above, the contribution of torque down control to the start of a rotation change is smaller than the contribution of engagement pressure increase control. Accordingly, a drop in the transmission torque transferred to the output shaft O can be reduced and the driver feels less unnatural.

The transmission shift control portion 43 starts rapid torque down control since the rotation speed difference ΔW1 of the release side engagement device becomes equal to or more than a predetermined start determination speed difference at time T16. After starting rapid torque down control, the transmission shift control portion 43 reduces (stepwise manner in this example) the torque of the driving force source to a torque lower than the pre-transmission shift torque (vehicle request torque) by a predetermined torque reduction amount at a speed faster than in gradual torque down control. The reduction amount of the torque of the driving force source by rapid torque down control affects the inertia system of the input shaft I and the reduction speed of the rotation speed of the input shaft I is further increased (from time T16 to time T17).

Since the rotation speed difference ΔW2 of the engagement side engagement device becomes equal to or less than a predetermined end determination speed at time T17, the transmission shift control portion 43 ends the torque down control and increases the torque of the driving force source to the pre-transmission shift torque (vehicle request torque). In addition, the transmission shift control portion 43 increases the engagement pressure of the engagement side engagement device to the full engagement pressure and ends the upshift control.

3-4-2-5-2. Middle Torque Range

Next, a case in which pre-transmission shift torque is in the middle torque range will be described with reference to FIG. 11.

The processing until time T23 is the same as the processing until time T13 in FIG. 10 except a change caused by a change in the pre-transmission shift torque, so duplicate description is omitted.

The pre-transmission shift torque, which is the torque of driving force source at the start (time T21) of upshift control, is approximately in the middle of the middle torque range in FIGS. 6 to 8.

Figure 11:
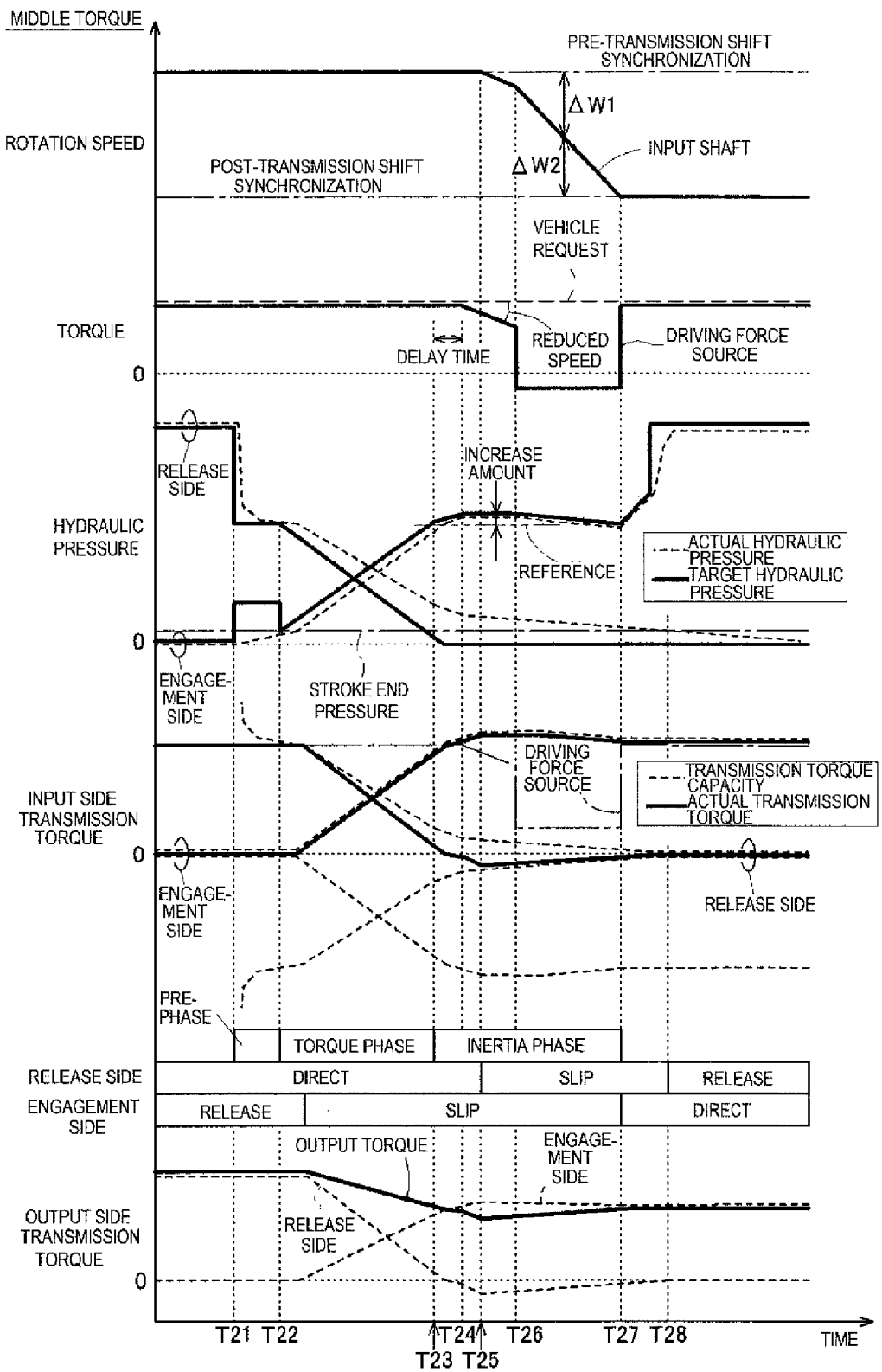
FIG. 11 is a time chart in the case of a middle torque range according to the embodiment of the disclosure.
Figure 12:
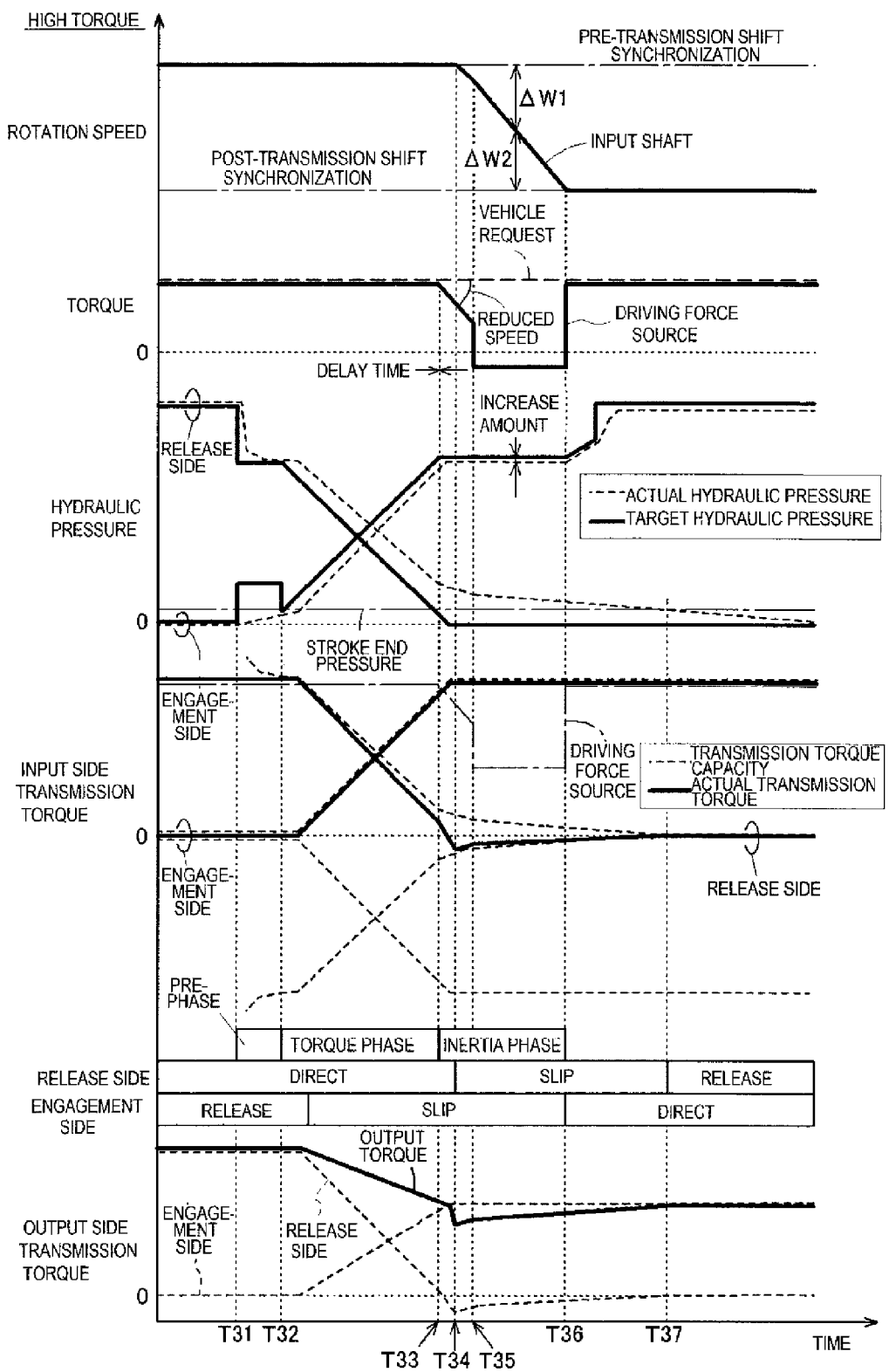
FIG. 12 is a time chart in the case of a high torque range according to the embodiment of the disclosure.

Also in the case illustrated in FIG. 11, as in the case in FIG. 10, a reduction delay in the actual hydraulic pressure of the release side engagement device becomes larger toward the vicinity of the stroke end pressure, the actual hydraulic pressure is larger than the stroke end pressure for some time (from time T23 to time T28) even after (time T23) reducing the target hydraulic pressure (instructed hydraulic pressure) to the stroke end pressure or less, and a transmission torque capacity is generated and the release state is not reached.

In contrast, the delay in an increase in the actual hydraulic pressure relative to an increase in the target hydraulic pressure (instructed hydraulic pressure) of the engagement side engagement device is smaller than the delay in the release side engagement device as in the case in FIG. 10.

<Inertia Phase Control>

The transmission shift control portion 43 starts inertia phase control upon completion of torque phase control (time T23).

After starting inertia phase control, the transmission shift control portion 43 starts the engagement pressure increase control, gradually increases the target hydraulic pressure (instructed hydraulic pressure) of the engagement side engagement device from the engagement side reference pressure by the temporary increase amount of the engagement pressure, and gradually reduces the target hydraulic pressure to the engagement side reference pressure (from time T23 to time T27). In the example illustrated in FIG. 11, since the pre-transmission shift torque belongs to the middle torque range, the temporary increase amount of the engagement pressure is set to an intermediate value.

In addition, since the pre-transmission shift torque belongs to the middle torque range, the delay time (from time T23 to time T24) from the end point of torque phase control to the start point of torque down control is set to an intermediate value.

As the target hydraulic pressure of the engagement side engagement device becomes larger than the engagement side reference pressure, the input side transmission torque of the engagement side engagement device becomes larger than the torque of the driving force source and the input side transmission torque of the engagement side engagement device becomes lower than zero (between time T23 and time T24). Since the temporary increase amount of the engagement pressure is set to an intermediate value in the middle torque range, reduction in the input side transmission torque of the release side engagement device is gentler to some extent than in the low torque range illustrated in FIG. 10.

Since the delay time of the start of torque down control has elapsed, the transmission shift control portion 43 starts gradual torque down control (time T24). Since the pre-transmission shift torque belongs to the middle torque range, the reduction speed of the torque of the driving force source is set to an intermediate value.

Since the torque of the driving force source is reduced after starting gradual torque down control, the magnitude of a negative torque obtained by subtracting the input side transmission torque of the engagement side engagement device from the torque of the driving force source is increased and the reduction speed of the input side transmission torque of the release side engagement device is increased (from time T24 to time T25).

When the input side transmission torque of the release side engagement device is reduced to a lower limit obtained by multiplying the transmission torque capacity of the release side engagement device by the minus sign, the release side engagement device shifts from the direct engagement state to the slip engagement state (time T25 and later). When the slip engagement state is reached, the negative torque obtained by multiplying the transmission torque capacity of the release side engagement device by the minus sign is transferred from the input shaft I to the output shaft O side via the release side engagement device.

Since the output side transmission torque of the engagement side engagement device is increased by engagement pressure increase control even in the middle torque range, reduction in the output torque can be suppressed by canceling the output side transmission torque (which becomes a negative torque) of the release side engagement device to some extent.

Since the reduction speed of the torque of the driving force source is set to an intermediate value and the delay time until the start of torque down control is set to an intermediate value, the reduction speed of rotation speed of the input shaft I after the release side engagement device is put in the slip engagement state is larger than in the low torque range illustrated in FIG. 10 and the time period (from time T23 to time T26) from starting inertia phase control until starting rapid torque down control is shortened.

When the pre-transmission shift torque is intermediate as described above, the contribution of torque down control to the start of a rotation change and the contribution of engagement pressure increase control are intermediately balanced. Accordingly, it is possible to shorten the delay after starting inertia phase control until occurrence of a rotation change and reduce a drop in the transmission torque of the output shaft O to the extent to which the driver does not feel unnatural.

The transmission shift control portion 43 starts rapid torque down control since the rotation speed difference $\Delta W1$ of the release side engagement device becomes equal to or more than a predetermined start determination speed difference at time T26. After starting rapid torque down control, the transmission shift control portion 43 reduces (stepwise manner in this example) the torque of the driving force source to a torque lower than the pre-transmission shift torque (vehicle request torque) by a predetermined torque reduction amount at a speed faster than in gradual torque down control. The reduction amount of the torque of the driving force source by rapid torque down control affects the inertia system of the input shaft I and the reduction speed of the rotation speed of the input shaft I is further increased (from time T26 to time T27).

Since the rotation speed difference $\Delta W2$ of the engagement side engagement device becomes equal to or less than a predetermined end determination speed at time T27, the transmission shift control portion 43 ends the torque down control and increases the torque of the driving force source to the pre-transmission shift torque (vehicle request torque). In addition, the transmission shift control portion 43 increases the engagement pressure of the engagement side engagement device to the full engagement pressure and ends the upshift control.

3-4-2-5-3. High Torque Range

Next, the case in which pre-transmission shift torque is in the high torque range will be described with reference to FIG. 12.

The processing until time T33 is the same as the processing until time T13 in FIG. 10 except a change caused by a change in the pre-transmission shift torque, so duplicate description is omitted.

The pre-transmission shift torque, which is the torque of driving force source at the start (time T31) of upshift control, belongs to the high torque range in FIGS. 6 to 8.

Also in the case illustrated in FIG. 12, as in the case in FIG. 10, a reduction delay in the actual hydraulic pressure of the release side engagement device becomes larger toward the vicinity of the stroke end pressure, the actual hydraulic pressure is larger than the stroke end pressure for some time (from time T33 to time T37) even after (after time T33) reducing the target hydraulic pressure (instructed hydraulic pressure) to the stroke end pressure or less, and a transmission torque capacity is generated and the release state is not reached.

In contrast, the delay in an increase in the actual hydraulic pressure relative to an increase in the target hydraulic pressure (instructed hydraulic pressure) of the engagement side engagement device is smaller than the delay in the release side engagement device as in the case in FIG. 10.

<Inertia Phase Control>

The transmission shift control portion 43 starts inertia phase control upon completion of torque phase control (time T33).

In this example, in the high torque range, the temporary increase amount of the engagement pressure in engagement pressure increase control is set to zero. Accordingly, in the example illustrated in FIG. 12, engagement pressure increase control is not performed.

In addition, the delay time (from time T23 to time T24) from the end point of torque phase control to the start point of torque down control is set to a value close to zero (the delay time is set to zero for sake of simplicity in the example illustrated in FIG. 12).

The transmission shift control portion 43 starts gradual torque down control upon completion of torque phase control (time T33). Since the pre-transmission shift torque belongs to the high torque range, the reduction speed of the torque of the driving force source is set to a relatively large value.

Since the torque of the driving force source is reduced at a relatively large gradient after starting gradual torque down control, the magnitude of a negative torque obtained by subtracting the input side transmission torque of the engagement side engagement device from the torque of the driving force source is increased and the reduction speed of the input side transmission torque of the release side engagement device is increased (time T33 and later).

The input side transmission torque of the release side engagement device is reduced earlier than in the middle torque range illustrated in FIG. 11 to a lower limit obtained by multiplying the transmission torque capacity of the release side engagement device by the minus sign and the release side engagement device shifts from the direct engagement state to the slip engagement state (time T34 and later). When the slip engagement state is reached, the negative torque obtained by multiplying the transmission torque capacity of the release side engagement device by the minus sign is transferred from the input shaft I to the output shaft O side via the release side engagement device.

In addition, the reduction speed of the rotation speed of the input shaft I after the release side engagement device is put in the slip engagement state is large and the period (from time T33 to time T35) from the start of inertia phase control to the start of rapid torque down control is shorter than in the middle torque range.

Since the torque transferred to the output shaft O is large in the high torque range, the driver does not easily feel more unnatural even when the negative torque transferred by the release side engagement device is not canceled by engagement pressure increase control.

When the pre-transmission shift torque is large as described above, the contribution of torque down control to the start of a rotation change is larger than the contribution of engagement pressure increase control. Accordingly, the delay until the occurrence of a rotation change after the start of inertia phase control can be shortened and the progress of the rotation change can be advanced.

At time T35, the transmission shift control portion 43 starts rapid torque down control since the rotation speed difference ΔW1 of the release side engagement device becomes equal to or more than a predetermined start determination speed difference. After starting rapid torque down control, the transmission shift control portion 43 reduces (stepwise manner in this example) the torque of the driving force source to a torque lower than the pre-transmission shift torque (vehicle request torque) by a predetermined torque reduction amount at a speed faster than in gradual torque down control. The reduction amount of the torque of the driving force source by rapid torque down control affects the inertia system of the input shaft I and the reduction speed of the rotation speed of the input shaft I is further increased (from time T35 to time T36).

Since the rotation speed difference ΔW2 of the engagement side engagement device becomes equal to or less than a predetermined end determination speed at time T36, the transmission shift control portion 43 ends the torque down control and increases the torque of the driving force source to the pre-transmission shift torque (vehicle request torque). In addition, the transmission shift control portion 43 increases the engagement pressure of the engagement side engagement device to the full engagement pressure and ends the upshift control.

OTHER EMBODIMENTS

Finally, other embodiments will be described. Incidentally, the configurations of embodiments described below are not limited to those respectively applied alone, but as long as no conflict arises, can be applied in combination with the configuration of other embodiments.

(1) The above embodiment shows an example in which the control device 30 includes the plurality of control units 32 to 34 and the plurality of the functional portions 41 to 45 are allocated to the plurality of control units 32 to 34. However, embodiments of the disclosure are not limited to this example. That is, the control device 30 may include the plurality of control units 32 to 34 described above as an integrated control device in any combination or as separated control devices and the allocation of the plurality of functional portions 41 to 45 may be determined arbitrarily.

(2) The above embodiment shows an example in which the transmission apparatus TM includes the two planetary gear mechanisms, the six engagement devices, and the six forward transmission shift stages, and each of the transmission shift stages is formed by engaging two of the six engagement devices. However, embodiments of the disclosure are not limited to this example. That is, the transmission apparatus TM may have any structure if two or more transmission shift stages are formed by the engagement of at least one engagement device. That is, the transmission apparatus TM may include two or more planetary gear mechanisms or one planetary gear mechanism, may include two or more engagement devices, and may include two or more forward transmission shift stages. Each of the transmission shift stages may be formed by the engagement of one engagement device or the engagement of three or more engagement devices.

(3) The above embodiment shows an example in which the start timing of torque down control is changed continuously in the middle torque range and the start timing of torque down control is set to a constant value in the low torque range and the high torque range in the setting map for the start timing of torque down control relative to the execution timing of torque phase control illustrated in FIG. 6. However, embodiments of the disclosure are not limited to this example. That is, as long as the transmission shift control portion 43 changes the start timing of torque down control relative to the execution timing of torque phase control according to at least the pre-transmission shift torque, any trend is allowed.

In addition, as long as the transmission shift control portion 43 delays the start timing of the torque down control relative to the execution timing of the torque phase control continuously or in a stepwise manner as at least the pre-transmission shift torque is reduced, any trend is allowed. For example, the start timing of the torque down control may be changed continuously or in a stepwise manner over the whole area including the low torque range, the middle torque range, and high torque range.

In addition, in some section of the pre-transmission shift torque, the start timing of torque down control relative to the execution timing of torque phase control may be advanced as the pre-transmission shift torque is reduced.

(4) The above embodiment shows an example in which the reduction speed is continuously changed in the middle torque range and the reduction speed is set to a constant value in the low torque range and the high torque range in the setting map for the reduction speed of the torque of the driving force source illustrated in FIG. 7. However, embodiments of the disclosure are not limited to this example. That is, as long as the transmission shift control portion 43 reduces the reduction speed of torque of the driving force source in the torque down control continuously or in a stepwise manner as at least the pre-transmission shift torque is reduced, any trend is allowed. For example, the reduction speed may be changed continuously or in a stepwise manner over the whole area including the low torque range, the middle torque range, and high torque range.

In addition, in some section of the pre-transmission shift torque, the reduction speed of the torque of the driving force source in torque down control may become large as the pre-transmission shift torque is reduced.

(5) The above embodiment shows an example in which the reduction speed is continuously changed in the middle torque range and the increase amount is set to a constant value in the low torque range and the high torque range in the setting map for the temporary increase amount of the engagement pressure illustrated in FIG. 8. However, embodiments of the disclosure are not limited to this example. That is, as long as the transmission shift control portion 43 increases the temporary increase amount of the engagement pressure in the engagement pressure increase control continuously or in a stepwise manner as at least the pre-transmission shift torque is reduced, any trend is allowed. For example, the increase amount may be changed continuously or in a stepwise manner over the whole area including the low torque range, the middle torque range, and high torque range.

In addition, in some section of the pre-transmission shift torque, the temporary increase amount of the engagement pressure in engagement pressure increase control may become small as the pre-transmission shift torque is reduced.

(6) The above embodiment shows an example in which the transmission shift control portion 43 performs start delay control for delaying the start timing of torque down control as the pre-transmission shift torque is reduced and speed reduction control for reducing the reduction speed of the torque of the driving force source as the pre-transmission shift torque is reduced. However, embodiments of the disclosure are not limited to this example. That is, the transmission shift control portion 43 only needs to perform one or both of start delay control and speed reduction control and, for example, may perform one of start delay control and speed reduction control. Alternatively, the transmission shift control portion 43 may switch the control to be performed (for example, the transmission shift control portion 43 may perform one or both of start delay control and speed reduction control according to the operation point of the pre-transmission shift torque) according to the operation point of the pre-transmission shift torque. In the case in which start delay control or speed reduction control is not performed, even when the pre-transmission shift torque is reduced, the start timing of torque down control is not delayed (for example, the start timing is made constant) or the reduction speed of the torque of the driving force source is not reduced (for example, the reduction speed is made constant).

(7) The above embodiment shows an example in which the transmission shift control portion 43 performs gradual torque down control and rapid torque down control as torque down control and delays the start timing of gradual torque down control relative to the execution timing of torque phase control as the pre-transmission shift torque is reduced. However, embodiments of the disclosure are not limited to this example. That is, the transmission shift control portion 43 may perform rapid torque down control without performing gradual torque down control and may delay the start timing of rapid torque down control relative to the execution timing of torque phase control as the pre-transmission shift torque is reduced.

INDUSTRIAL APPLICABILITY

The disclosure is preferably applicable to a control device for controlling a vehicle driving device provided with a transmission apparatus including a plurality of engagement devices in a power transmission path between a driving force source and wheels and selectively forming a plurality of transmission shift stages having different transmission shift ratios depending on engagement states of the plurality of engagement devices.

The invention claimed is:

1. A control device for controlling a vehicle driving device provided with a transmission apparatus including a plurality of engagement devices in a power transmission path between a driving force source and a wheel and selectively forming a plurality of transmission shift stages having different transmission shift ratios depending on engagement states of the plurality of engagement devices, the control device comprising:
    an electronic control unit that includes control logic, which when executed:
        starts upshift control for switching to a transmission shift stage having a lower transmission shift ratio,
        performs torque phase control for increasing an engagement pressure of an engagement side engagement device to be engaged for the switching to the transmission shift stage, the engagement side engagement device being one of the plurality of engagement devices, and reducing an engagement pressure of a release side engagement device to be released for the switching to the transmission shift stage, the release side engagement device being one of the plurality of engagement devices, and
        performs inertia phase control for increasing a rotation speed difference of the release side engagement device and reducing a rotation speed difference of the engagement side engagement device to perform a rotation change after starting the torque phase control,
    wherein the electronic control unit performs torque down control for reducing a torque of the driving force source in the inertia phase control and changes a start timing of the torque down control relative to an execution timing of the torque phase control according to at least a pre-transmission shift torque, which is the torque of the driving force source before starting the upshift control.

2. The control device for a vehicle driving device according to claim 1, wherein the electronic control unit delays the start timing of the torque down control relative to the execution timing of the torque phase control continuously or in a stepwise manner as the pre-transmission shift torque is reduced.

3. The control device for a vehicle driving device according to claim 1, wherein the electronic control unit reduces a reduction speed of a torque of the driving force source in the torque down control continuously or in a stepwise manner as the pre-transmission shift torque is reduced.

4. The control device for a vehicle driving device according to claim 1, wherein, after starting the inertia phase control, the electronic control unit performs engagement pressure increase control for temporarily increasing the engagement pressure of the engagement side engagement device and changes a temporary increase amount of the engagement pressure in the engagement pressure increase control according to the pre-transmission shift torque.

5. The control device for a vehicle driving device according to claim 4, wherein the electronic control unit increases the temporary increase amount of the engagement pressure in the engagement pressure increase control continuously or in a stepwise manner as the pre-transmission shift torque is reduced.

6. The control device for a vehicle driving device according to claim 1, wherein the electronic control unit delays the start timing of the torque down control relative to the execution timing of the torque phase control continuously or in a stepwise manner as the transmission shift ratio of the transmission shift stage after the upshift control is reduced.

7. The control device for a vehicle driving device according to claim 1, wherein, after starting the torque down control, the electronic control unit:
performs, as the torque down control, gradual torque down control for gradually reducing the torque of the driving force source,
ends the gradual torque down control after a rotation speed difference of the release side engagement device is generated,
performs rapid torque down control for reducing the torque of the driving force source at a speed higher than in the gradual torque down control, and
delays the start timing of the gradual torque down control relative to the execution timing of the torque phase control continuously or in a stepwise manner as the pre-transmission shift torque is reduced.

8. The control device for a vehicle driving device according to claim 2, wherein the electronic control unit reduces a reduction speed of a torque of the driving force source in the torque down control continuously or in a stepwise manner as the pre-transmission shift torque is reduced.

9. The control device for a vehicle driving device according to claim 2, wherein, after starting the inertia phase control, the electronic control unit performs engagement pressure increase control for temporarily increasing the engagement pressure of the engagement side engagement device and changes a temporary increase amount of the engagement pressure in the engagement pressure increase control according to the pre-transmission shift torque.

10. The control device for a vehicle driving device according to claim 3, wherein, after starting the inertia phase control, the electronic control unit performs engagement pressure increase control for temporarily increasing the engagement pressure of the engagement side engagement device and changes a temporary increase amount of the engagement pressure in the engagement pressure increase control according to the pre-transmission shift torque.

11. The control device for a vehicle driving device according to claim 5, wherein the electronic control unit:
delays the start timing of the torque down control relative to the execution timing of the torque phase control continuously or in a stepwise manner, and
increases the temporary increase amount of the engagement pressure in the engagement pressure increase control continuously or in a stepwise manner as one or both of the transmission shift ratio of the transmission shift stage before the upshift control and the transmission shift ratio of the transmission shift stage after the upshift control are reduced.

12. The control device for a vehicle driving device according to claim 2, wherein the electronic control unit delays the start timing of the torque down control relative to the execution timing of the torque phase control continuously or in a stepwise manner as the transmission shift ratio of the transmission shift stage after the upshift control is reduced.

13. The control device for a vehicle driving device according to claim 2, wherein, after starting the torque down control, the electronic control unit:
performs, as the torque down control, gradual torque down control for gradually reducing the torque of the driving force source,
ends the gradual torque down control after a rotation speed difference of the release side engagement device is generated,
performs rapid torque down control for reducing the torque of the driving force source at a speed higher than in the gradual torque down control, and
delays the start timing of the gradual torque down control relative to the execution timing of the torque phase control continuously or in a stepwise manner as the pre-transmission shift torque is reduced.

14. The control device for a vehicle driving device according to claim 8, wherein, after starting the inertia phase control, the electronic control unit performs engagement pressure increase control for temporarily increasing the engagement pressure of the engagement side engagement device and changes a temporary increase amount of the engagement pressure in the engagement pressure increase control according to the pre-transmission shift torque.

15. The control device for a vehicle driving device according to claim 4, wherein the electronic control unit:
delays the start timing of the torque down control relative to the execution timing of the torque phase control continuously or in a stepwise manner, and
increases the temporary increase amount of the engagement pressure in the engagement pressure increase control continuously or in a stepwise manner as one or both of the transmission shift ratio of the transmission shift stage before the upshift control and the transmission shift ratio of the transmission shift stage after the upshift control are reduced.

16. The control device for a vehicle driving device according to claim 3, wherein the electronic control unit delays the start timing of the torque down control relative to the execution timing of the torque phase control continuously or in a stepwise manner as the transmission shift ratio of the transmission shift stage after the upshift control is reduced.

17. The control device for a vehicle driving device according to claim 3, wherein, after starting the torque down control, the electronic control unit:
performs, as the torque down control, gradual torque down control for gradually reducing the torque of the driving force source, ends the gradual torque down control after a rotation speed difference of the release side engagement device is generated, performs rapid torque down control for reducing the torque of the driving force source at a speed higher than in the gradual torque down control, and delays the start timing of the gradual torque down control relative to the execution timing of the torque phase control continuously or in a stepwise manner as the pre-transmission shift torque is reduced.

18. The control device for a vehicle driving device according to claim 14, wherein the electronic control unit increases the temporary increase amount of the engagement pressure in the engagement pressure increase control continuously or in a stepwise manner as the pre-transmission shift torque is reduced.

19. The control device for a vehicle driving device according to claim 4, wherein the electronic control unit delays the start timing of the torque down control relative to the execution timing of the torque phase control continuously or in a stepwise manner as the transmission shift ratio of the transmission shift stage after the upshift control is reduced.

20. The control device for a vehicle driving device according to claim 4, wherein, after starting the torque down control, the electronic control unit:

performs, as the torque down control, gradual torque down control for gradually reducing the torque of the driving force source, ends the gradual torque down control after a rotation speed difference of the release side engagement device is generated, performs rapid torque down control for reducing the torque of the driving force source at a speed higher than in the gradual torque down control, and delays the start timing of the gradual torque down control relative to the execution timing of the torque phase control continuously or in a stepwise manner as the pre-transmission shift torque is reduced.

* * * * *